United States Patent [19]
Simon

[11] Patent Number: 5,897,201
[45] Date of Patent: Apr. 27, 1999

[54] ARCHITECTURAL LIGHTING DISTRIBUTED FROM CONTAINED RADIALLY COLLIMATED LIGHT

[76] Inventor: Jerome H. Simon, 17 Suffolk Rd., Chestnut Hill, Mass. 02167

[21] Appl. No.: 08/201,466

[22] Filed: Feb. 25, 1994

Related U.S. Application Data

[63] Continuation-in-part of application No. 08/006,623, Jan. 21, 1993, abandoned.

[51] Int. Cl.$^6$ .................................................... F21V 13/12
[52] U.S. Cl. ............................. 362/268; 362/31; 362/32; 362/147; 362/245; 362/309; 362/327; 362/331; 362/332
[58] Field of Search ......................... 359/724, 727–731, 359/641, 710, 711; 362/31–33, 148, 150, 307–309, 327, 330, 331, 332, 336, 227–252, 268

[56] References Cited

U.S. PATENT DOCUMENTS

| | | | |
|---|---|---|---|
| 1,900,436 | 3/1933 | Dourgnon | 362/336 |
| 1,929,020 | 10/1933 | Exelmans | 362/309 |
| 2,344,221 | 3/1944 | Trautner | 362/309 |
| 2,359,151 | 9/1944 | Pennow | 362/267 |
| 3,739,169 | 6/1973 | Weinreich | 362/309 |
| 4,159,511 | 6/1979 | Dejonc | 362/309 |
| 5,043,850 | 8/1991 | Dreyer, Jr. | 362/242 |
| 5,046,805 | 9/1991 | Simon | 385/31 |
| 5,057,974 | 10/1991 | Mizobe | 362/331 |
| 5,130,908 | 7/1992 | Simon | 362/150 |

FOREIGN PATENT DOCUMENTS

| | | | |
|---|---|---|---|
| 796169 | 10/1968 | Canada | 362/309 |
| 1012774 | 12/1965 | United Kingdom | 362/308 |

*Primary Examiner*—Alan Cariaso
*Attorney, Agent, or Firm*—Jerry Cohen; Harvey Kaye; Perkins, Smith & Cohen, LLP

[57] ABSTRACT

From a quasi point source, light distribution means produce a selected one or ones of broadly distributed ambient light, non-shadowing task illumination, multibeam display lighting, projective lineal lighting and projective surface washing illumination lineally or radially distributed. Collimation optics shape light from a quasi point source into a disc of selected axial thickness. Containment optics contain divergence of and direct light from the collimation optics to distribution optics. The distribution optics modulates and redirects the radiant energy into a shape or shapes useful in illuminating architectural space. The distribution optics may reflect or refract light to direct and shape it for a particular architectural illumination requirement. The efficient combination of the optics provides for a system of minimized thickness, permitting maximum flexibility in integration with or within shelves, soffits and other structural members.

65 Claims, 38 Drawing Sheets

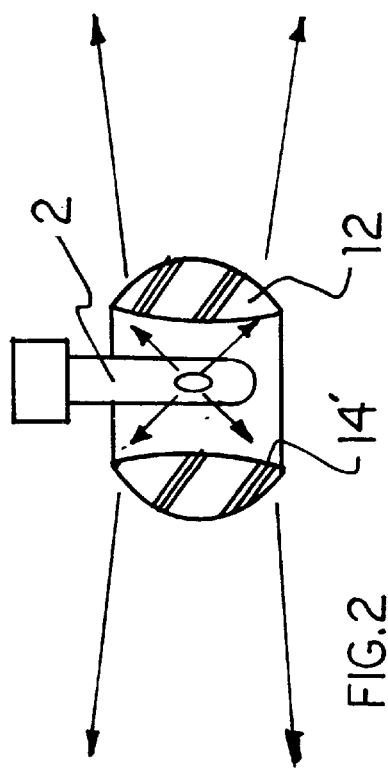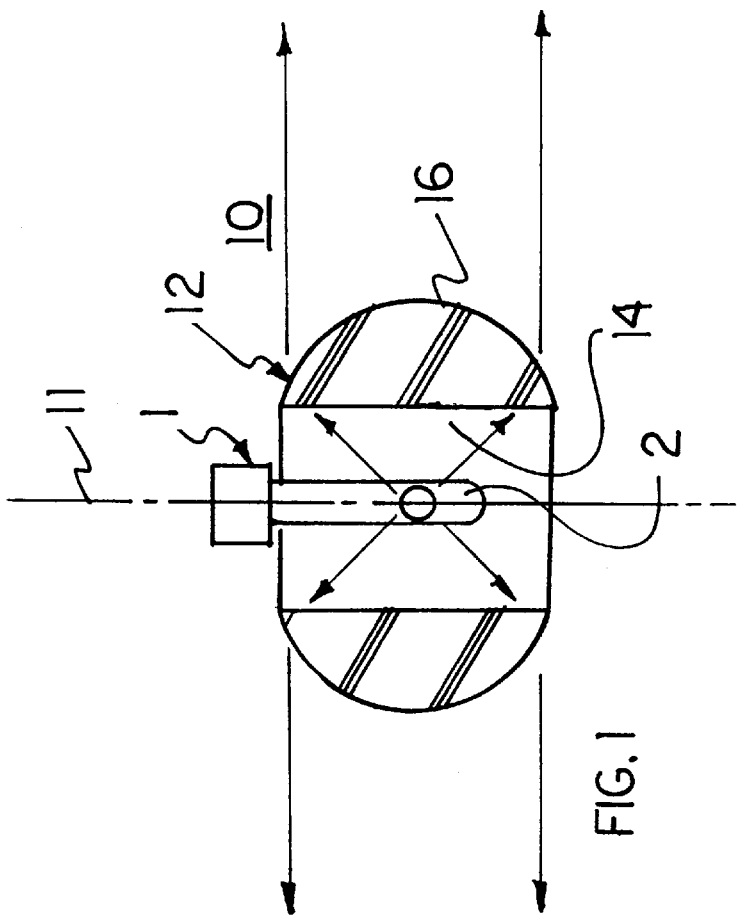

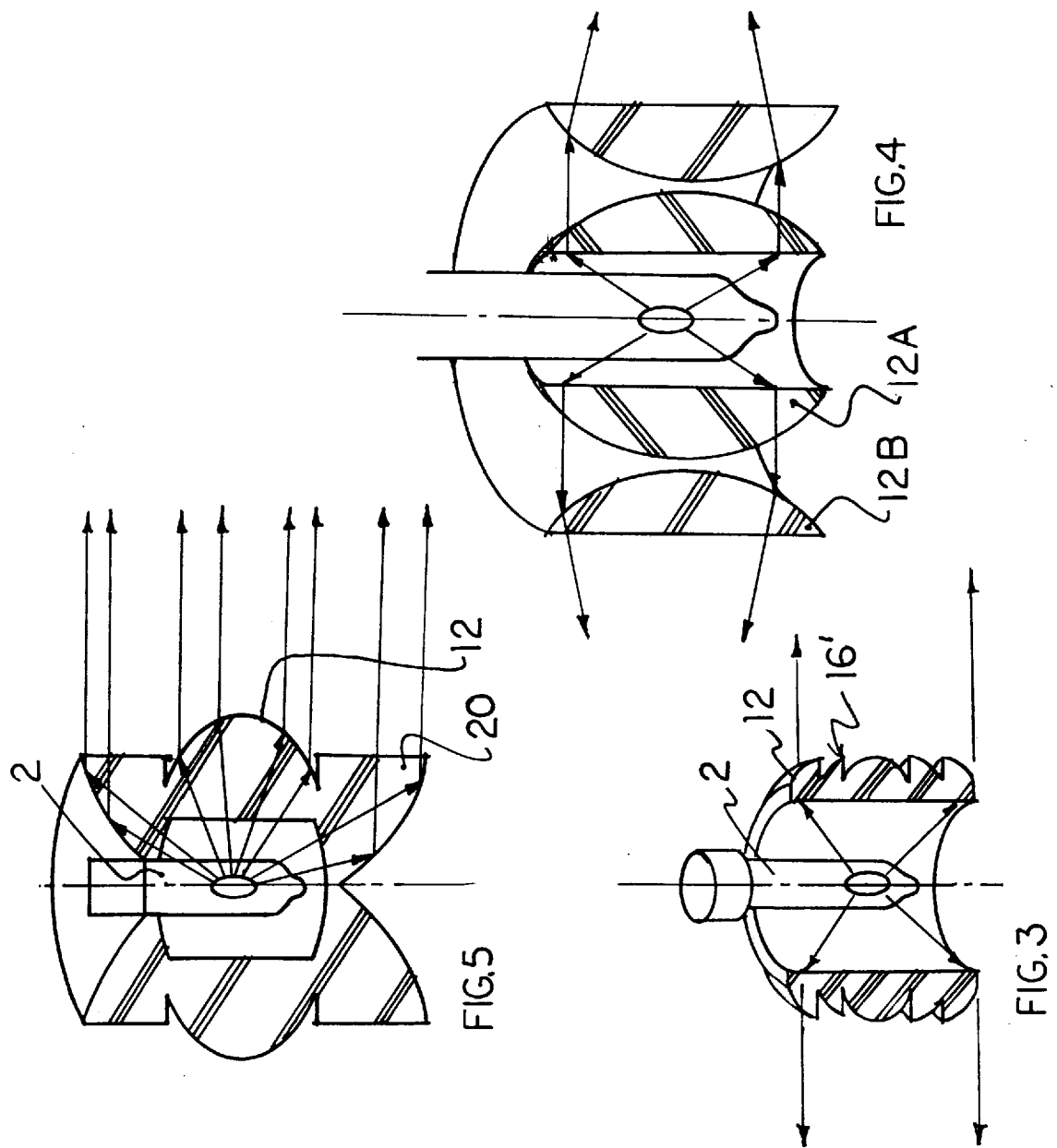

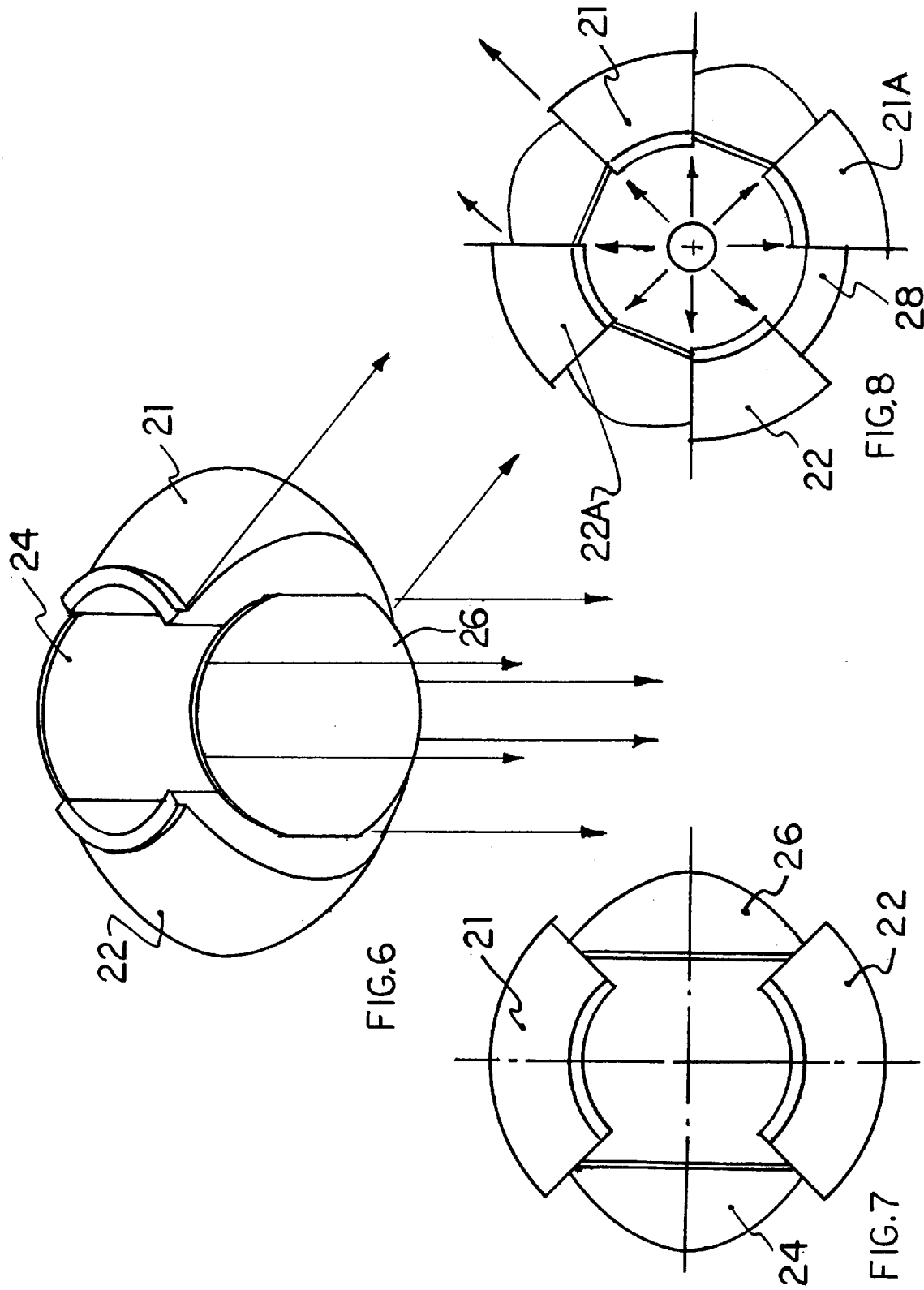

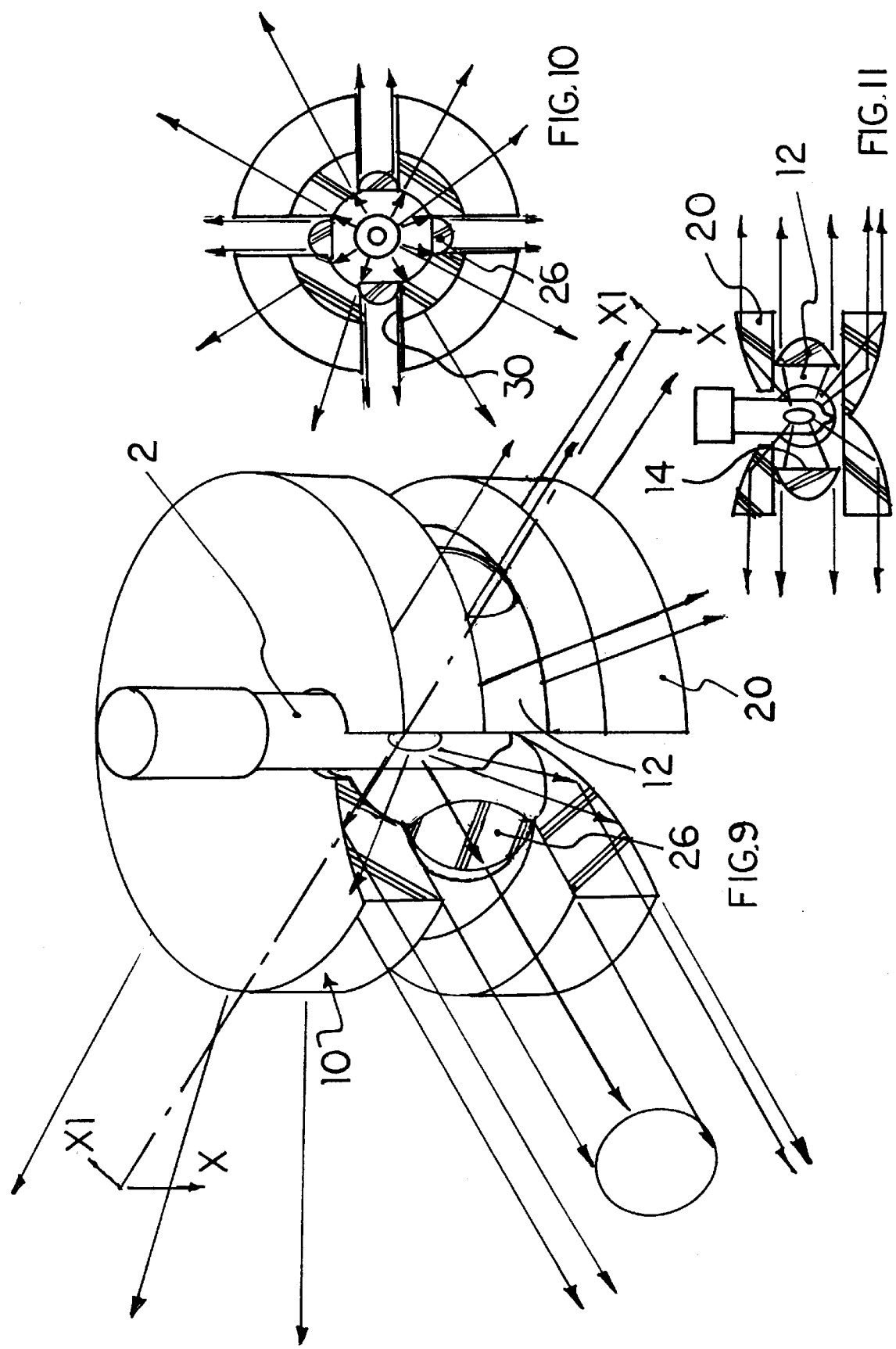

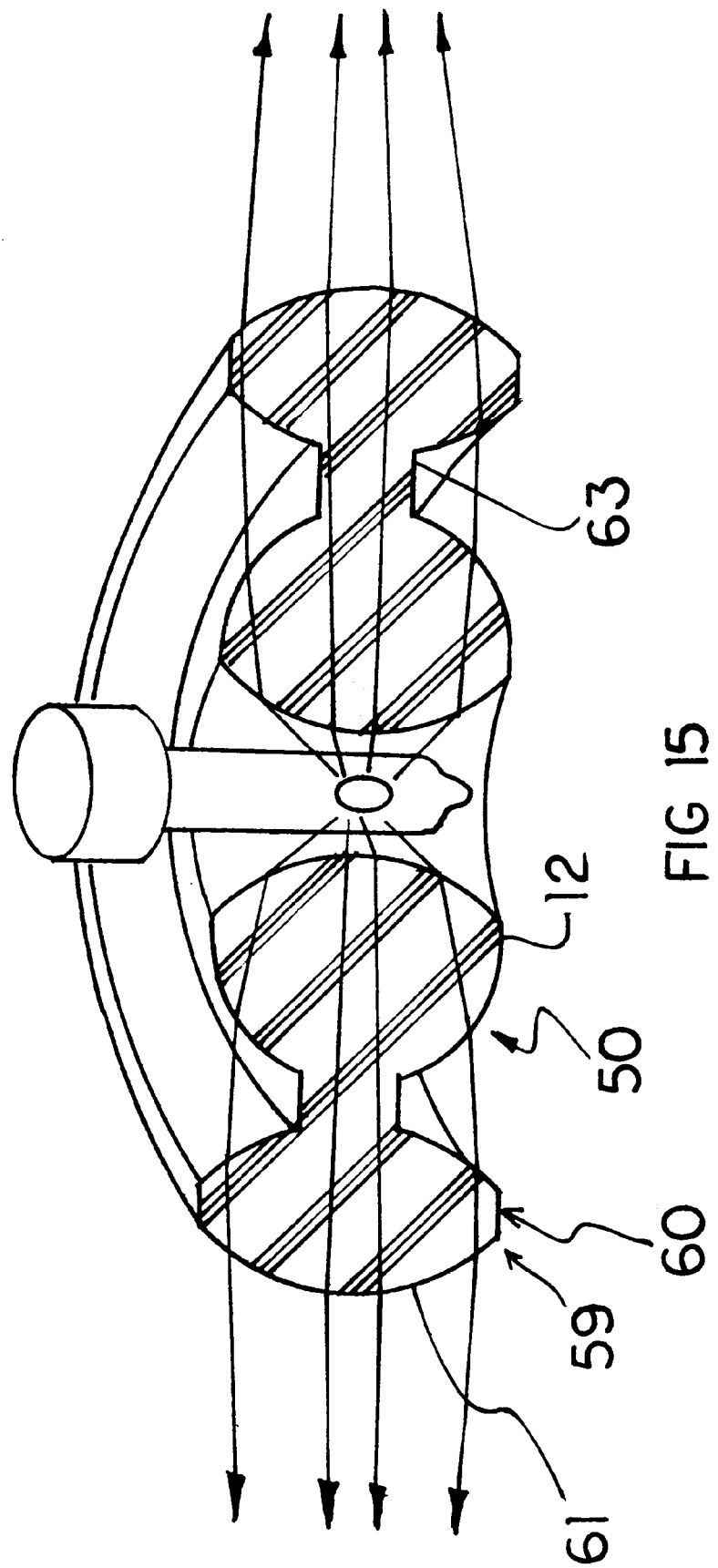

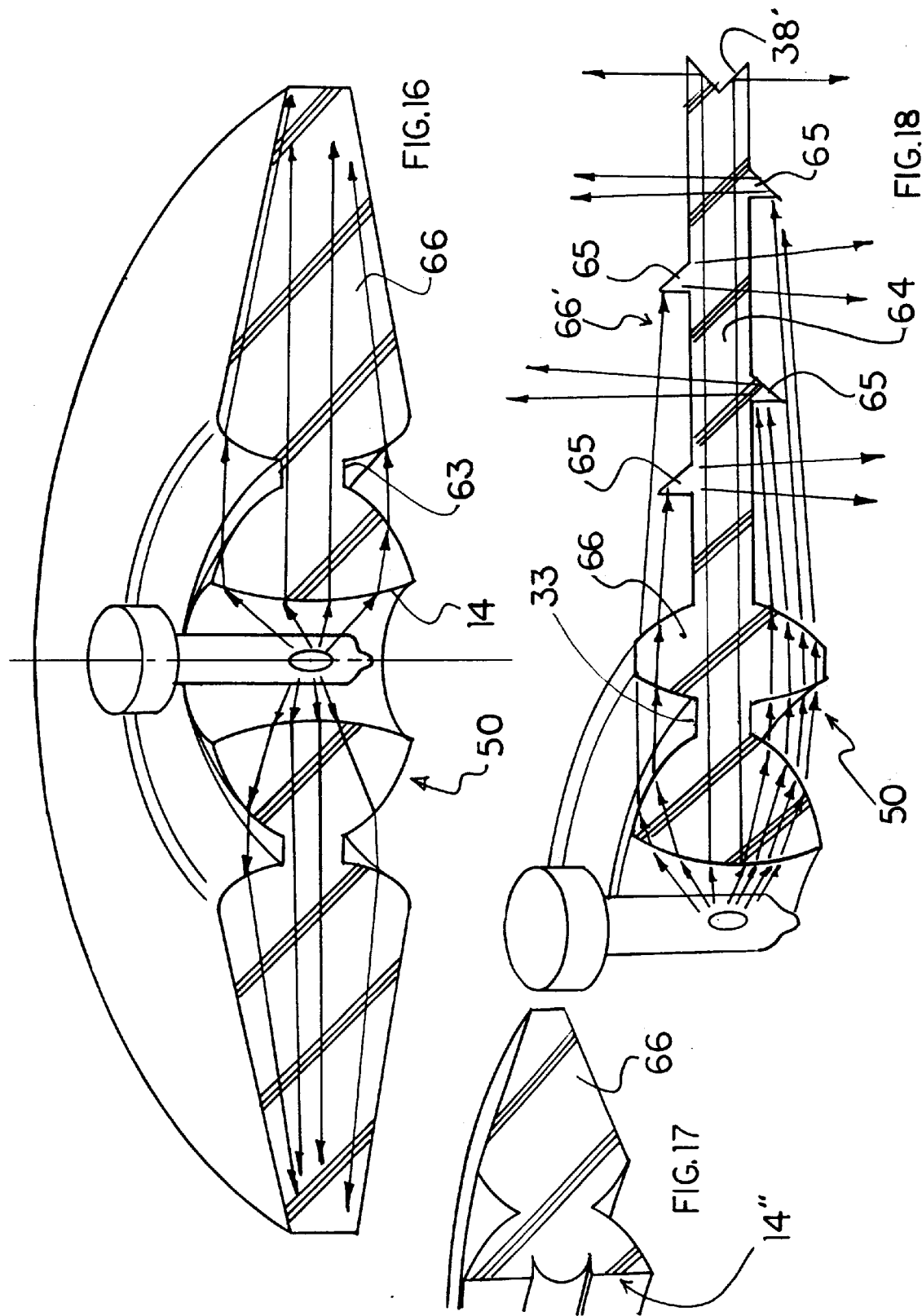

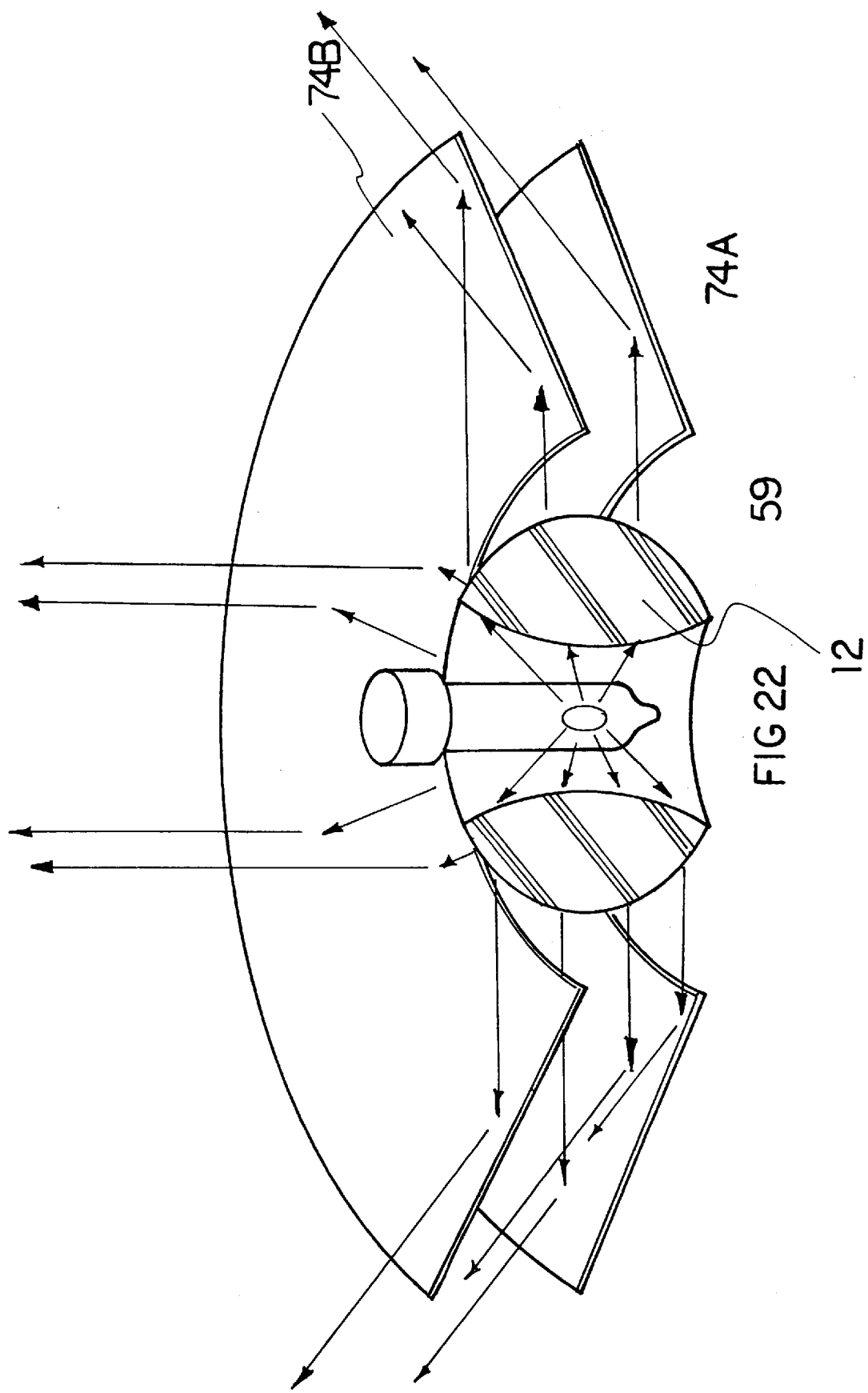

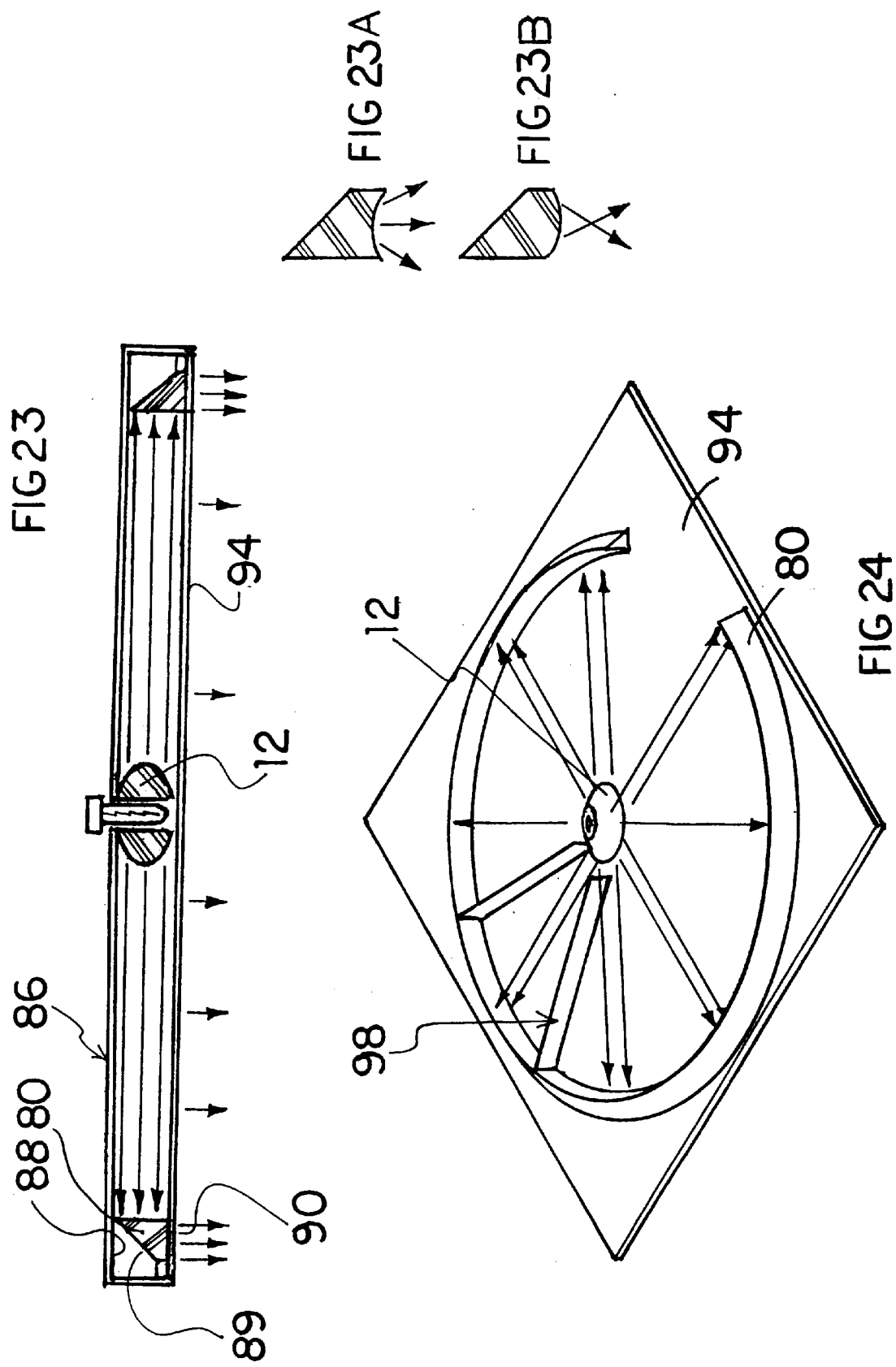

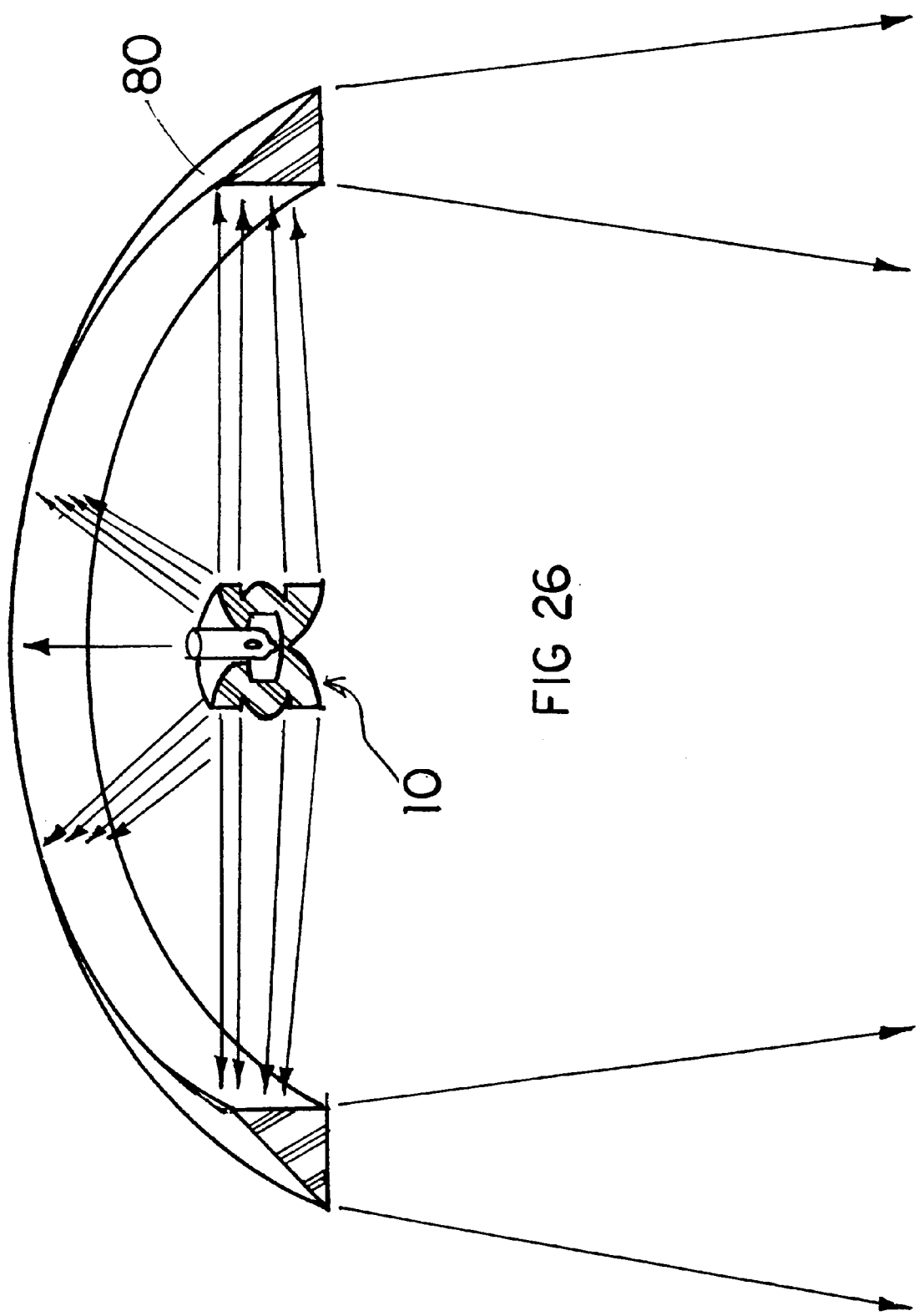

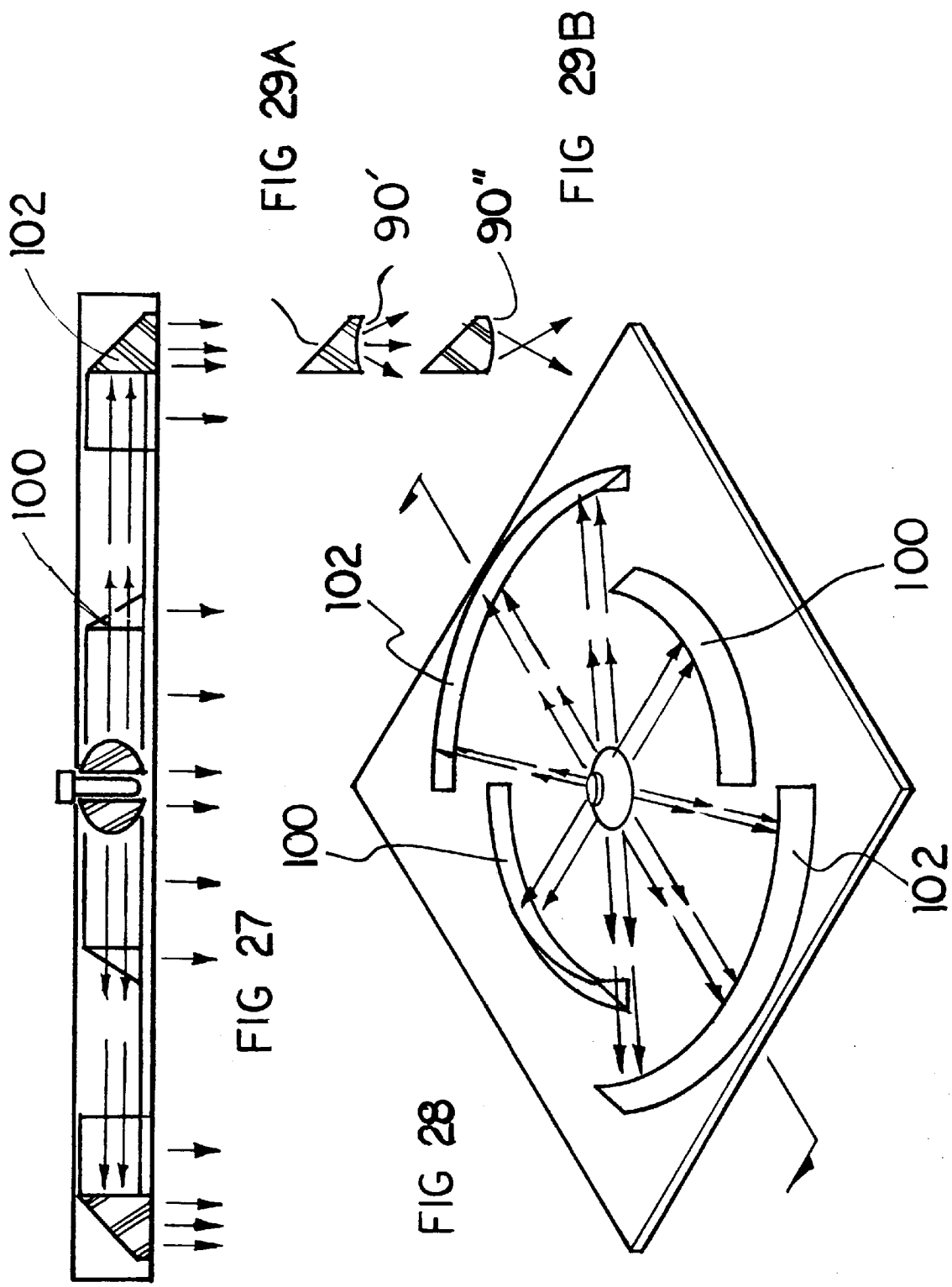

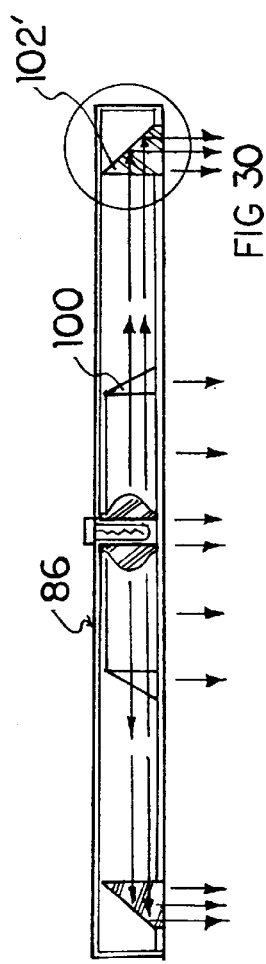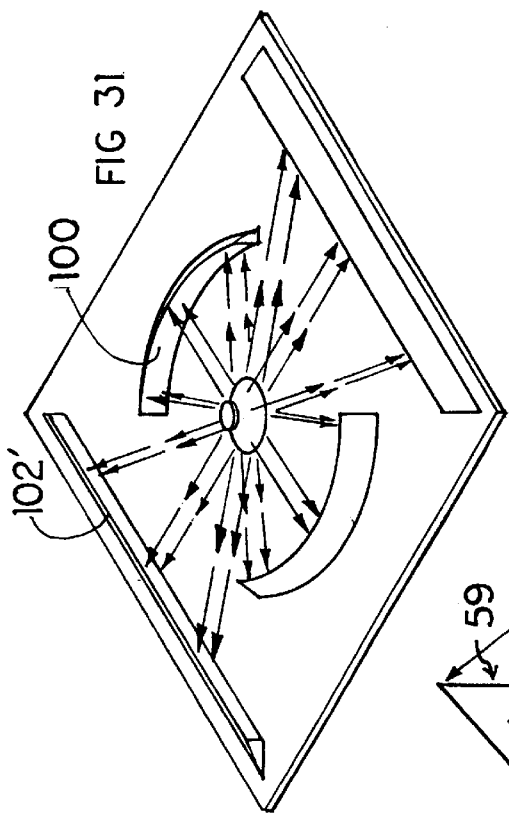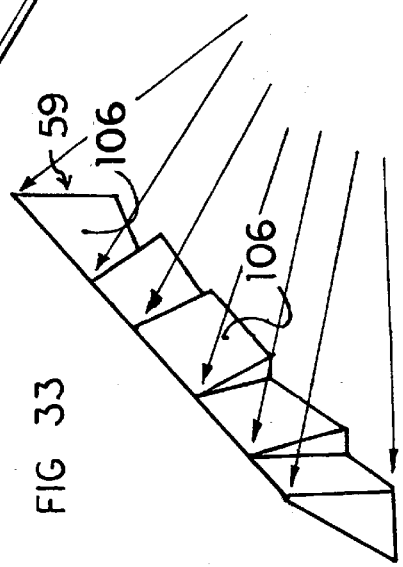

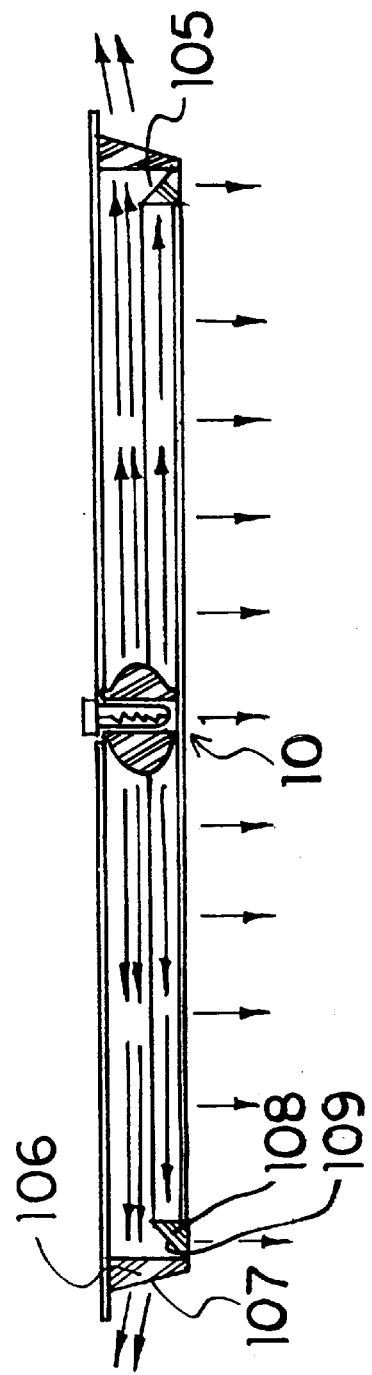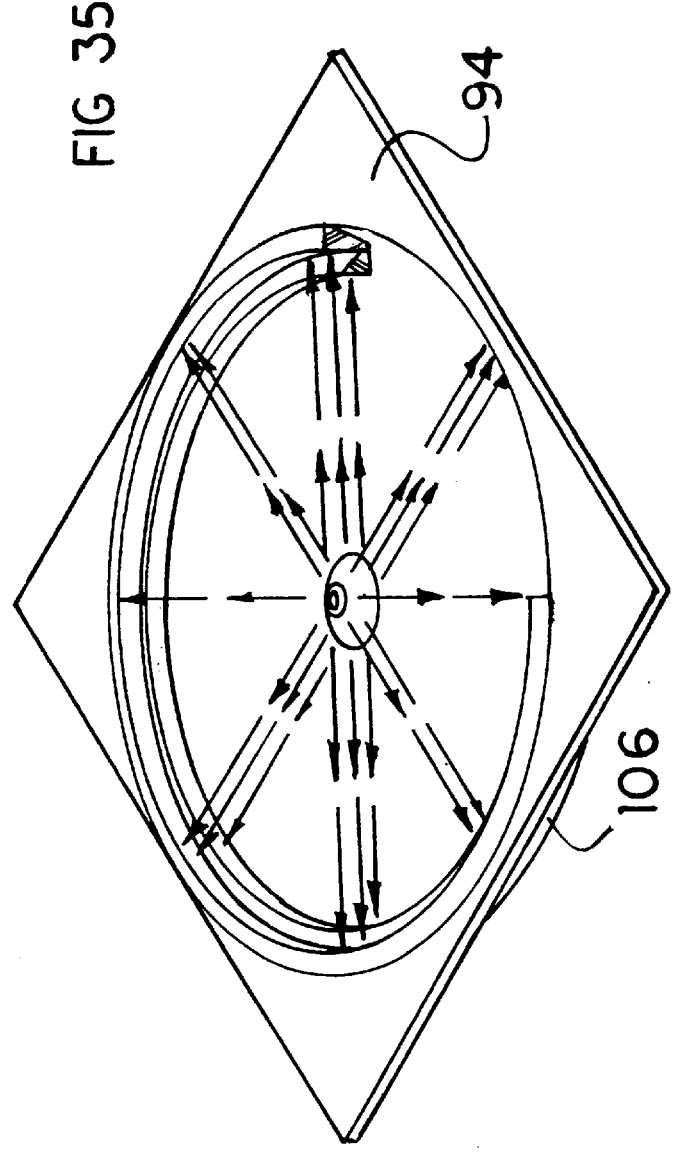

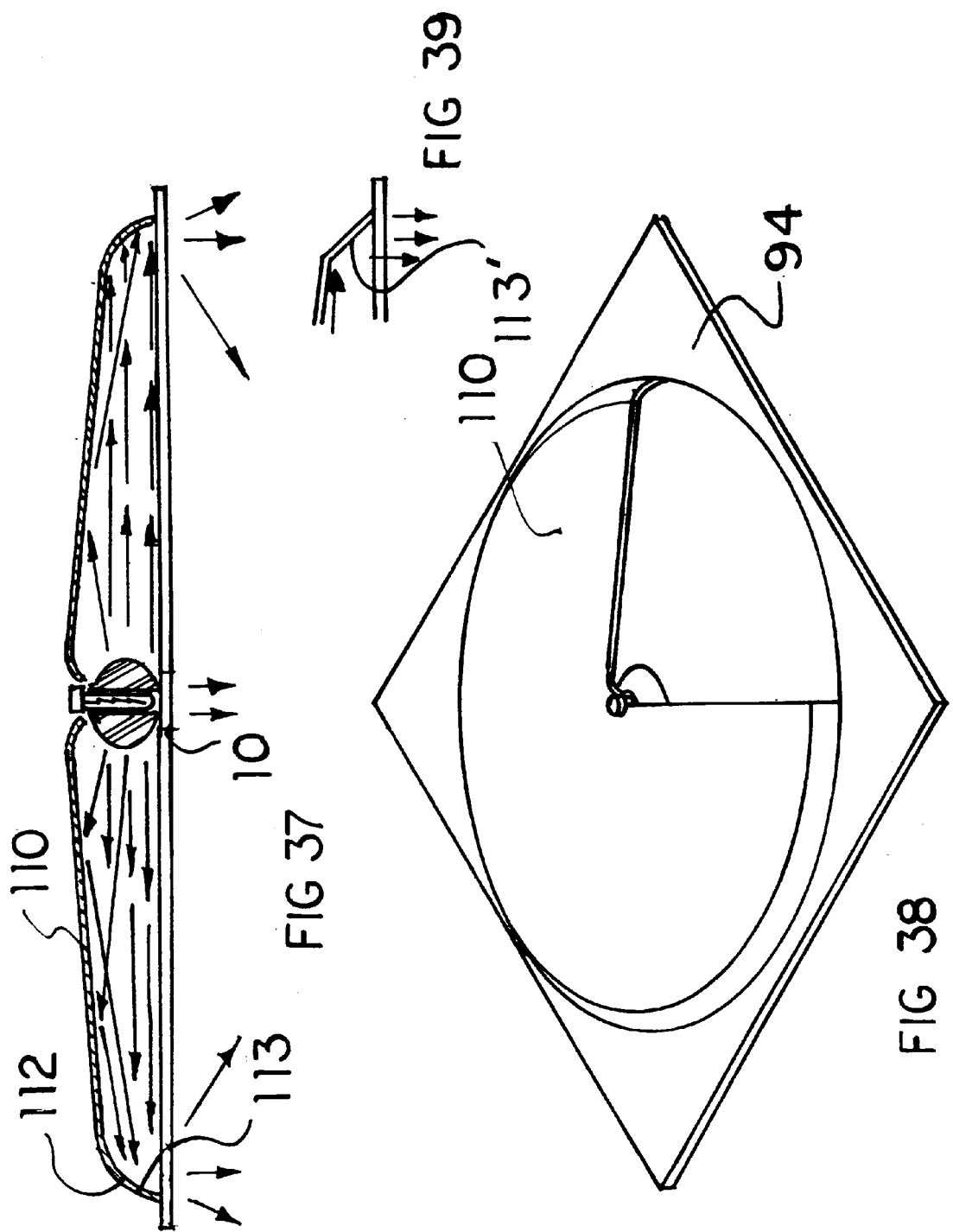

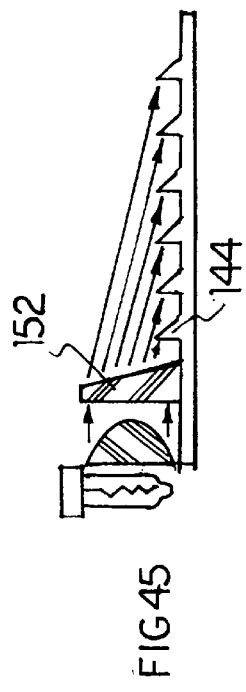
FIG 45
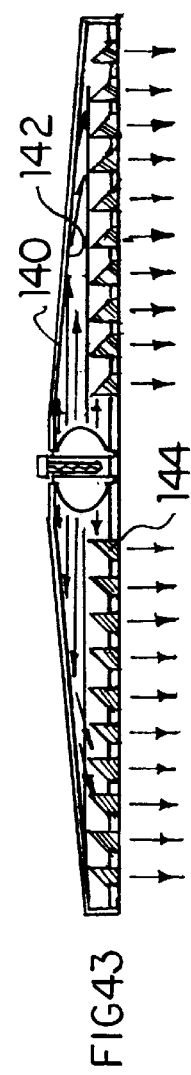
FIG 43
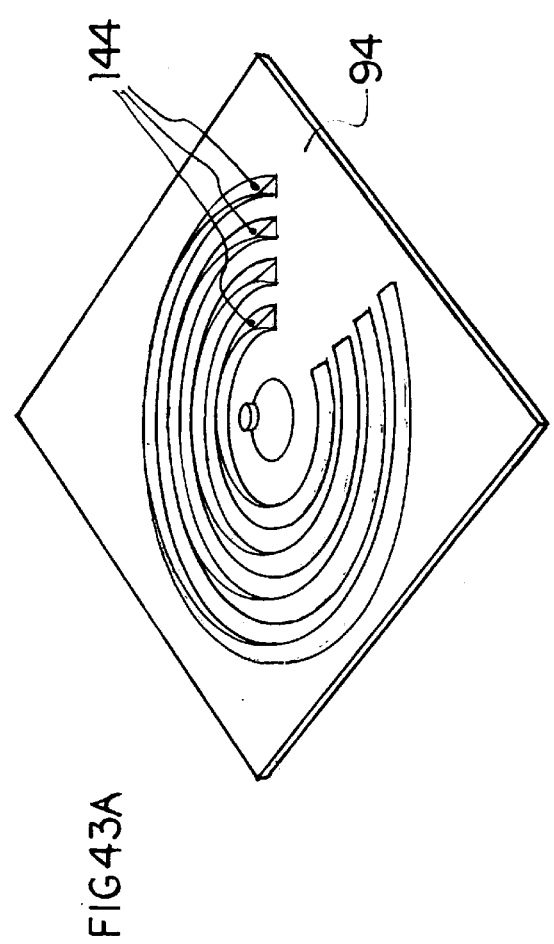
FIG 43A

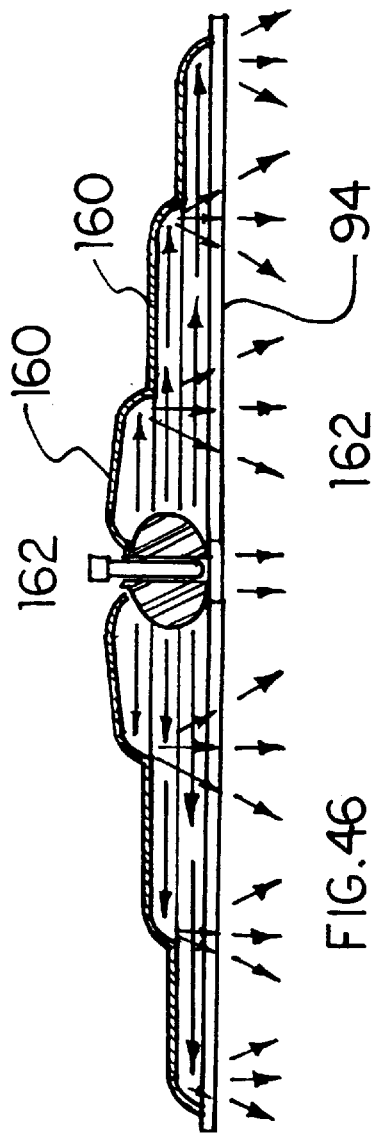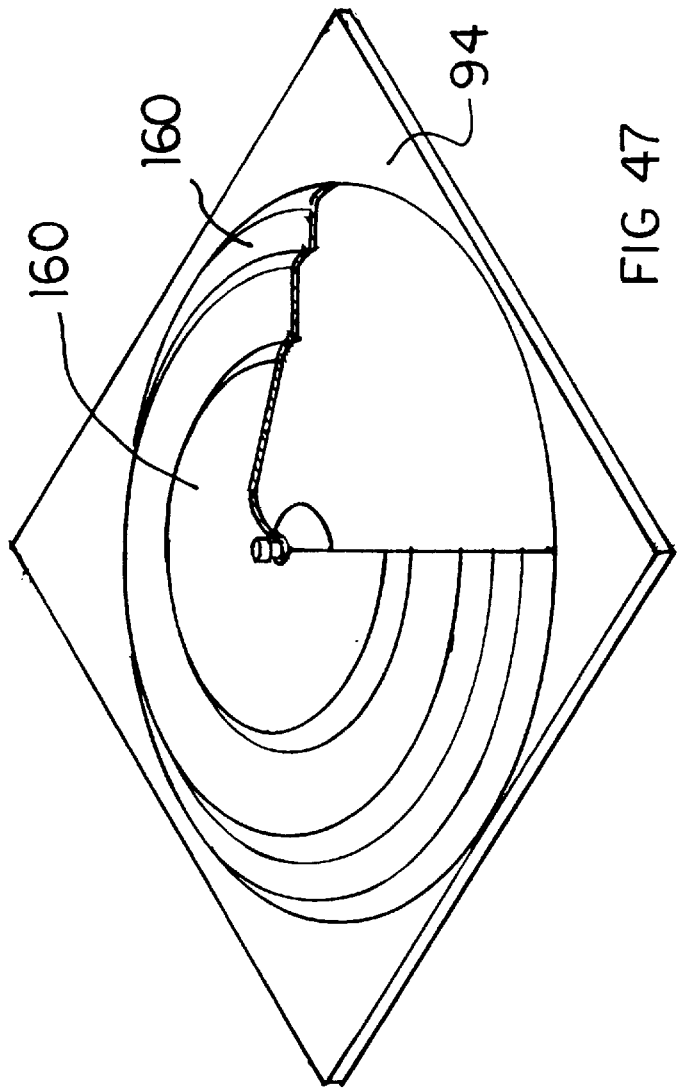

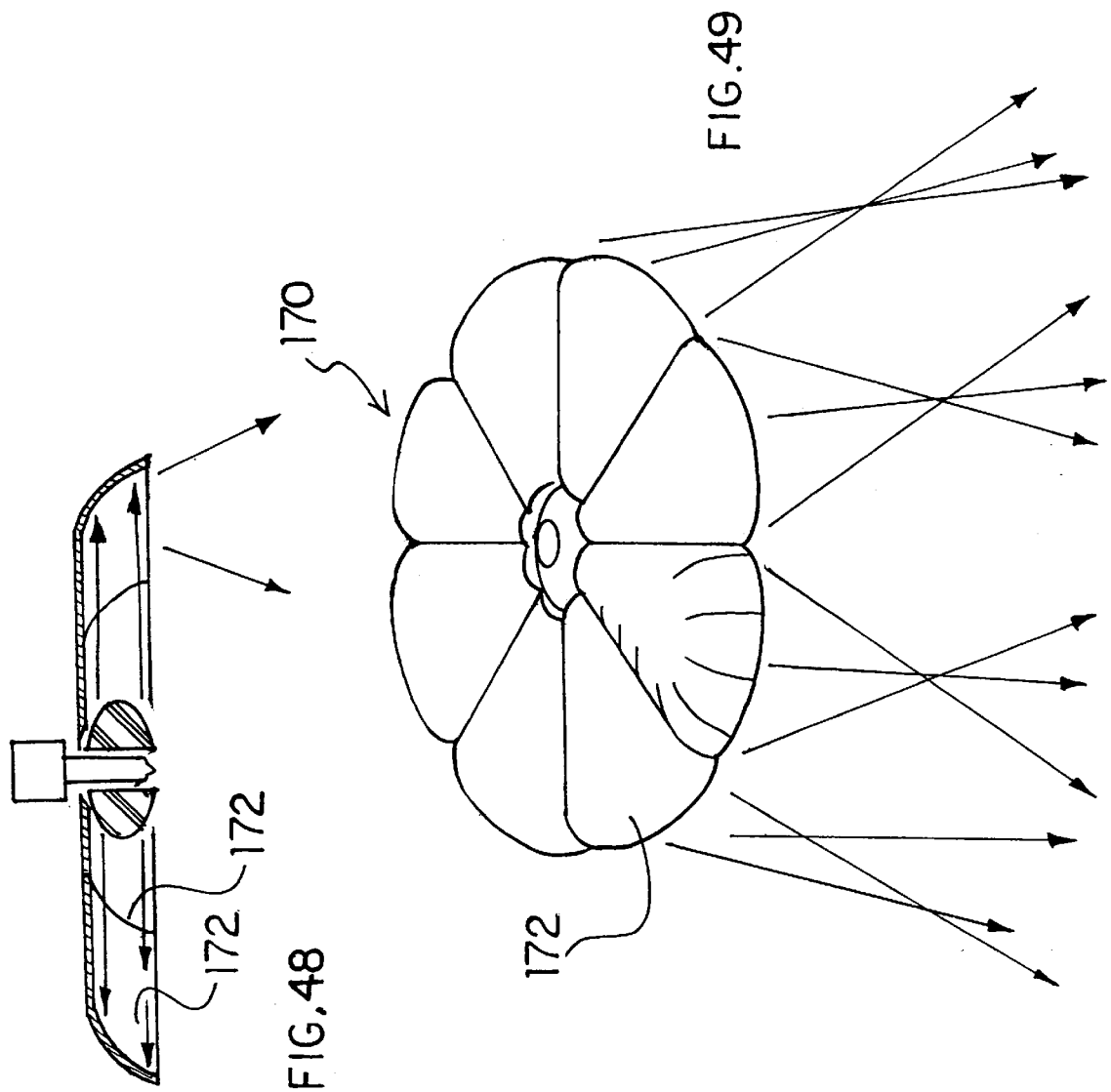

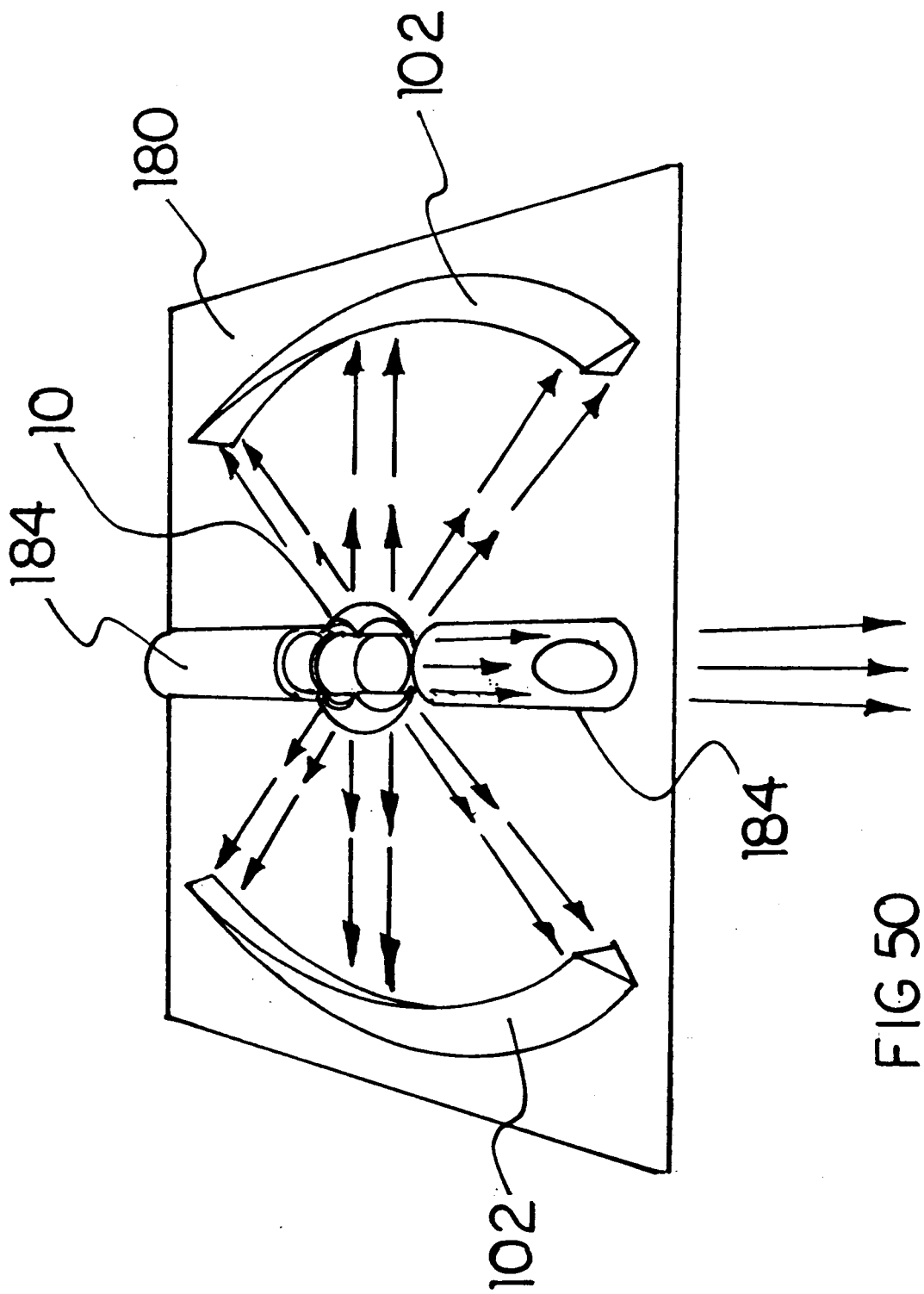

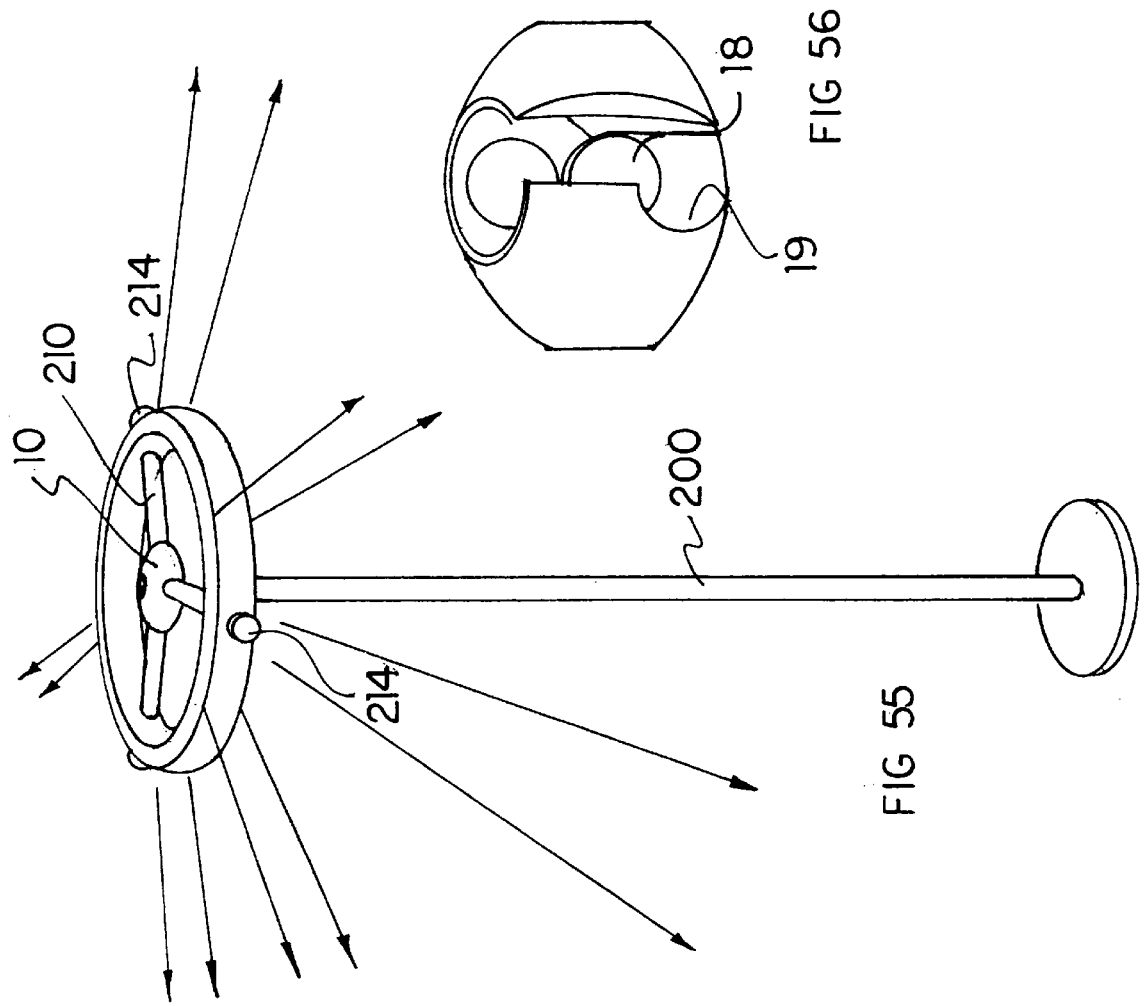

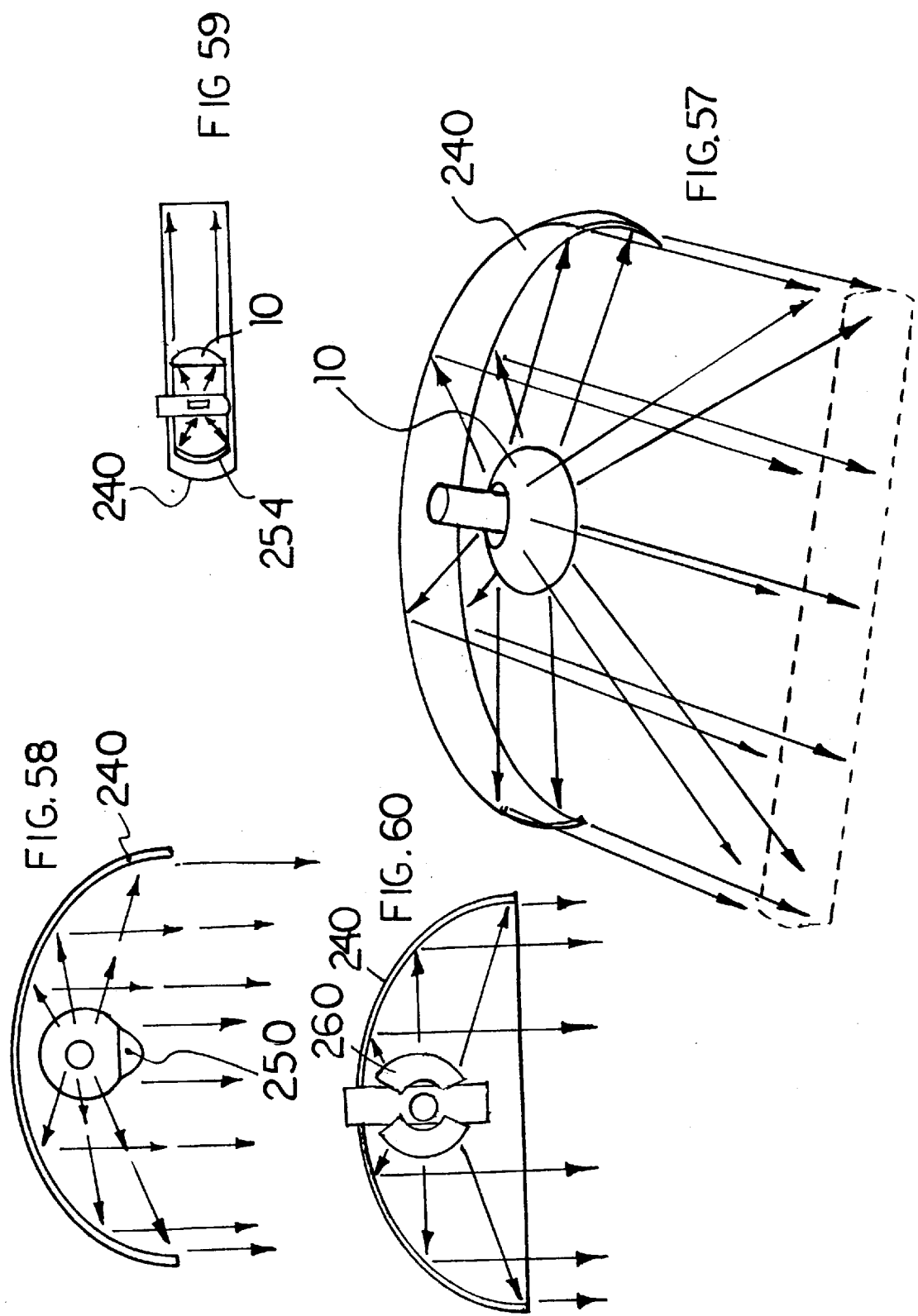

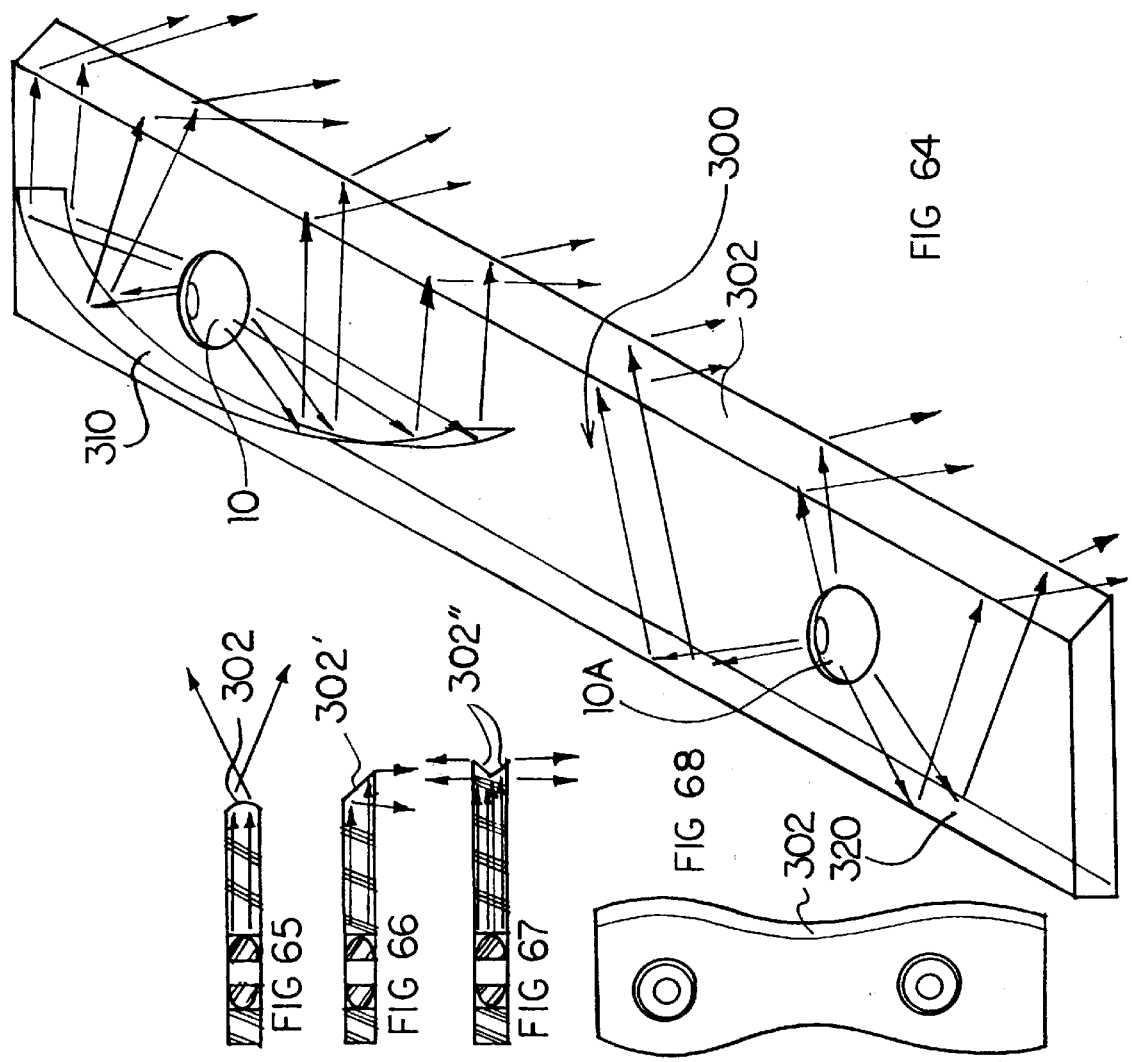

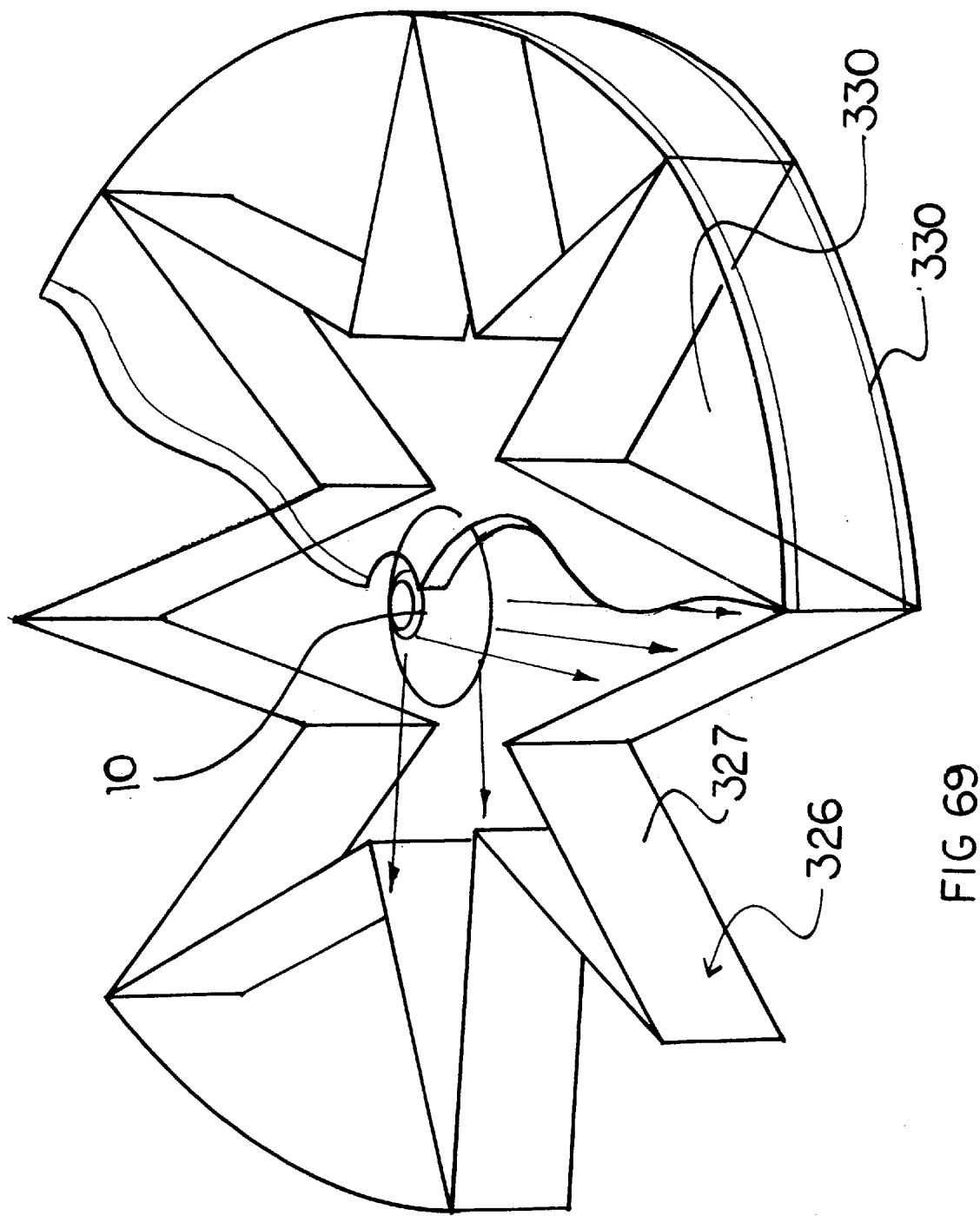

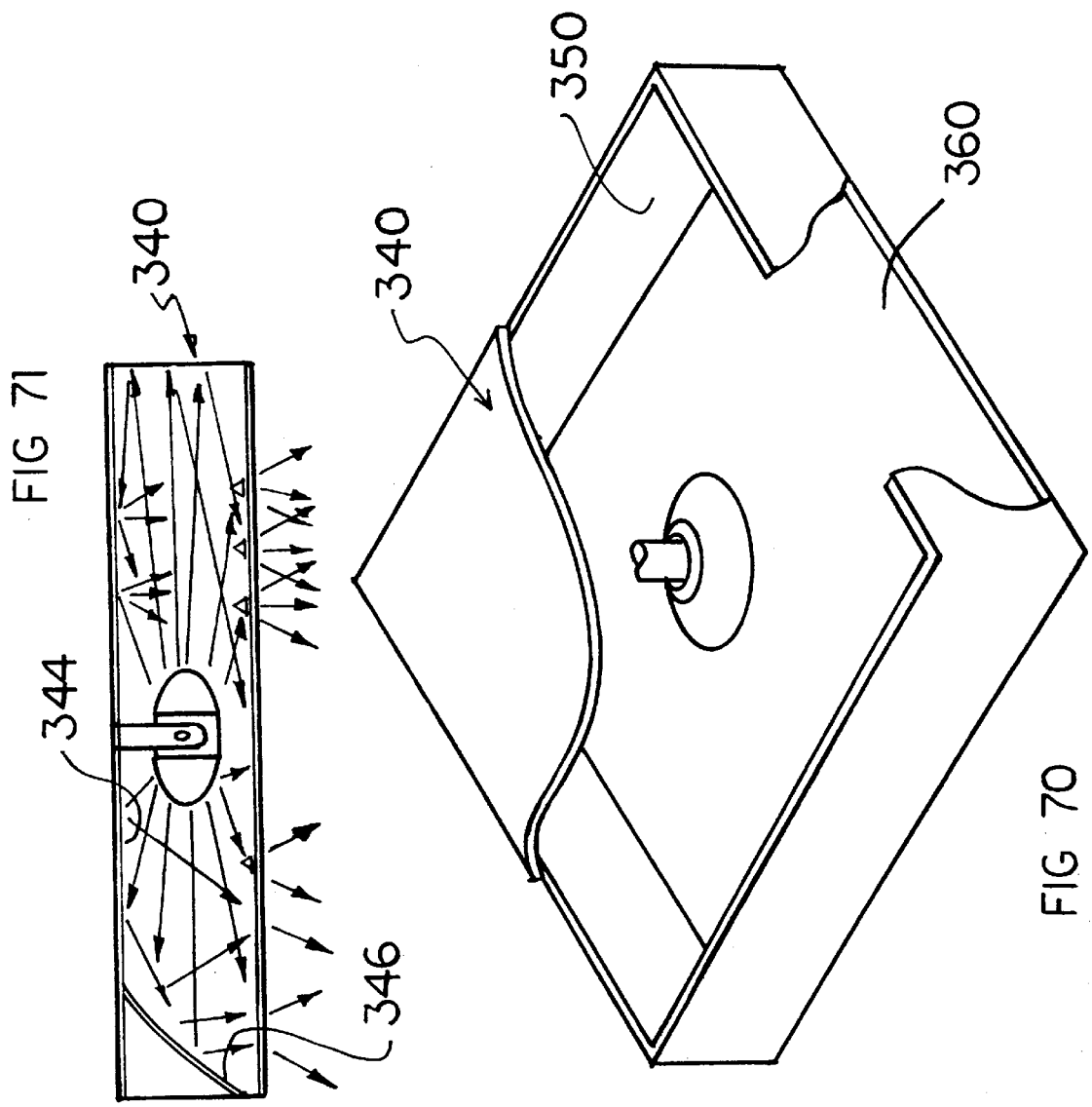

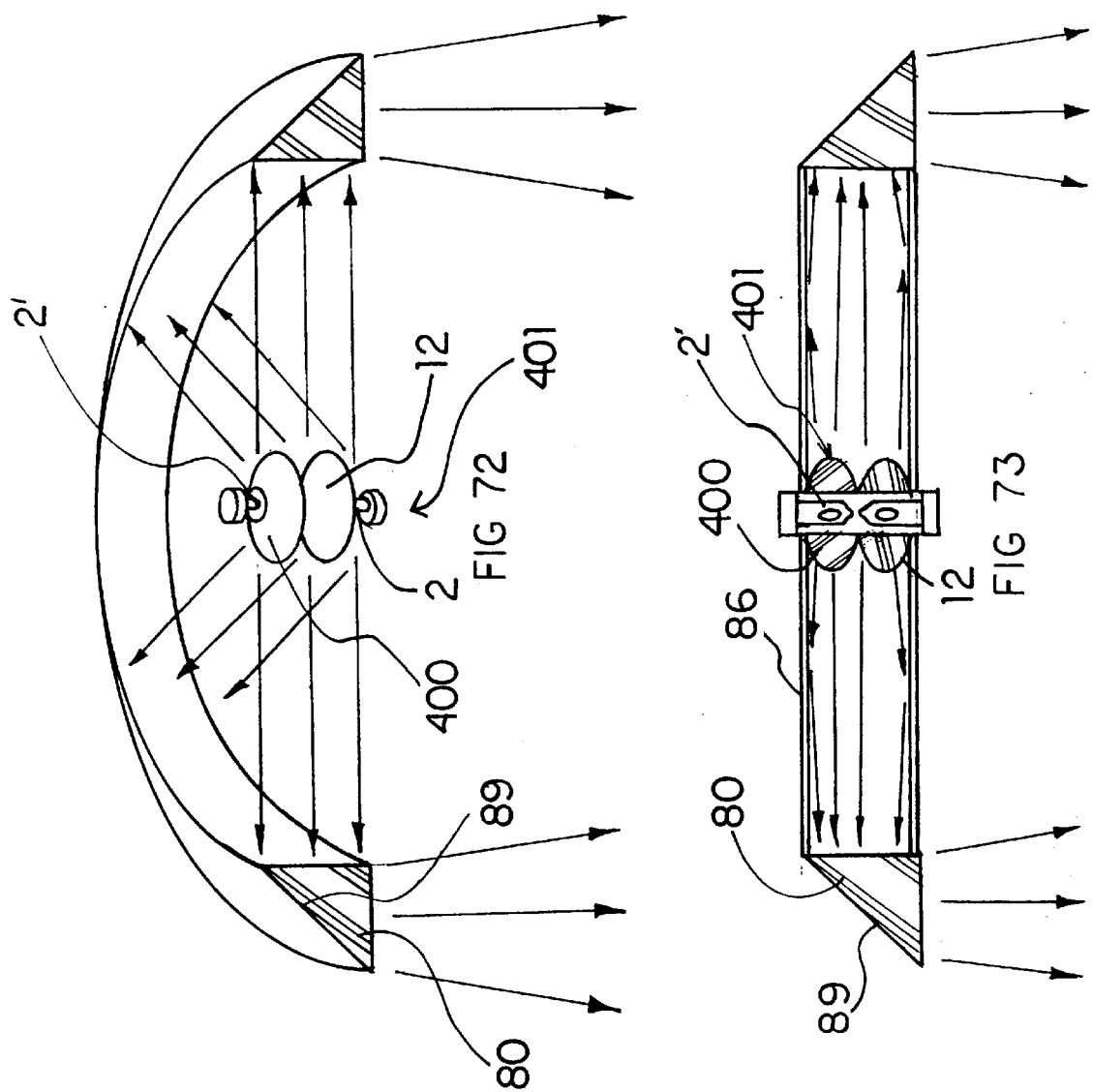

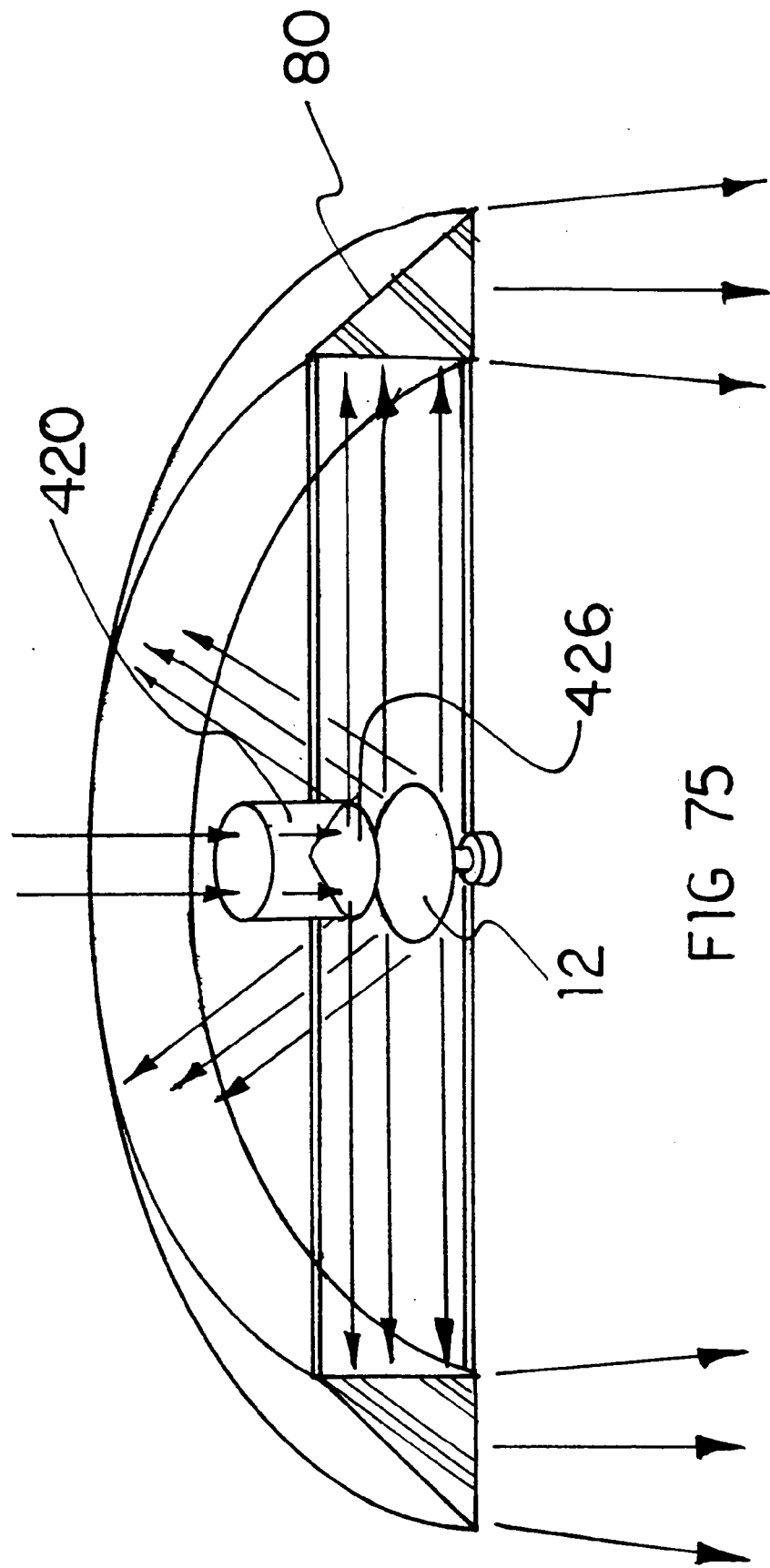

ARCHITECTURAL LIGHTING DISTRIBUTED FROM CONTAINED RADIALLY COLLIMATED LIGHT

This application is a continuation-in-part of my copending application Ser. No. 08/006,623 filed Jan. 21, 1993 and now abandoned.

BACKGROUND OF THE INVENTION

The present invention relates to a system for producing shaped and directed light from a quasi point sourceor quasipoint sources a selected one or ones of broadly distributed ambient light, non-shadowing task illumination, multibeam display lighting, projective lineal lighting and projective surface washing illumination lineally or radially distributed. The present invention relates to improved use of radiant energy from a quasi point source. The present specification primarily discusses collimation and shaping of visible light, since this is the collimation application for the invention at the present time, but other forms of radiant energy, for example infrared energy for heating, could be similarly distributed. The quasi point source may conveniently comprise a metal halide lamp. For simplicity in description, the terms radiant energy and light will be used interchangeably in the present description. In my patent application Ser. No. 08/006,623, I have described means for utilizing collimation means to provide radial collimation for a quasi point source, and producing a cylinder of light which is transmitted for distribution by further means. The present invention provides advancements in distribution and shaping of light utilizing distribution optics in conjunction with radial collimation means. In further embodiments, further improvements are provided wherein an "f" number is minimized, where the "f" number is inversely proportional to efficiency of light capture of the source by the radial collimation means.

There is a need to provide high intensity, efficient, directed, non-glare illumination to cover a large area or a plurality of spaces. Typical current solutions require the use of a plurality of sources such as separate bulbs in separate downlights. One system may need to contain one group of light bulbs of a first wattage as well as other bulbs of differing types in order to meet particular lighting requirements. For example, a spotlight is almost invariably provided with an incandescent source, while relatively low power ambient lighting is provided by fluorescent tubes. This results in complexity and expense in installation and in inconvenience and expense in maintenance.

Typical prior art systems for distributing light from a source commonly lack flexibility in the number of different directions in which light may be directed from a single source. They are also characterized by complexity and lack of efficiency. In most existing lighting systems, energy is gathered by a parabolic or ellipsoidal reflector and distributed in a conical shape. The system of the present invention does not need such reflectors as a collimation means of collection. A radially formed collimation device feeds modulation means. The present invention provides for a simplicity in construction and compactness in layout for any of a number of different types of systems. Systems constructed in accordance with the present invention may provide for lighting the interior of a room, the exterior of a vehicle or other space.

In making devices using radially collimated light, it would be highly desirable to provide lighting fixtures able to be constructed in flat or thin shapes. A significant characteristic in many applications is thickness. Means that capture collimated light for further distribution are referred to in the present invention as distribution optics. Means that collimate light in at least a radial degree of freedom are referred to in the context of the present invention as collimation optics. In typical prior art systems, in order to capture a desired percentage of radially collimated light for further distribution, means which may be viewed as corresponding to the distribution optics must of necessity be significantly thicker in an axial direction than the prior art means which correspond to the present invention's collimation optics. This will result in a light distribution means constructed in accordance with prior art principles for a particular light shaping other application being significantly thicker than such means constructed in accordance with the present invention. The present invention will allow integration of means for producing a given light distribution into an architectural member. For example, a shelf may be provided which produces illumination on areas or items below it. A ceiling or wall panel that would be otherwise totally impractical due to its thickness may be produced with dimensions for maximizing flexibility in its utilization. Use of a high efficiency high intensity light source is permitted from which light may be distributed over a broad area or into a plurality or separate volumes with minimized glare and lamps not being visible.

SUMMARY OF THE INVENTION

It is therefore a general object of the present invention to provide an illumination means including radial light collimation optics, containment optics and optics for distributing and shaping collimated light to illuminate the interior or exterior of an architectural space, which could be a vehicle.

It is an additional general object of the present invention to provide an illumination means of the type described wherein the collimation, containment and distribution optics are matched to each other to provide maximum efficiency of light distribution from the quasi point source.

It is also a general object of the present invention to provide a highly controlled light distribution system wherein optics are provided by the system, and not by a source such as a floodlamp which includes both light emitting and reflecting means, whereby disposability of portions of a lighting system is reduced.

It is another object of the present invention to provide illumination means of the type describe to reduce the number of sources to illuminate a broad space by permitting the use of a single, high efficiency, high intensity source.

It is also a general object of the present invention to reduce the complexity of a light distribution system by elimination of the need to utilize differing types of lamps for differing types of lighting, e.g. task, ambient or display.

It is an additional general object of the present invention to provide an illumination means of the type described to minimize the complexity of maintenance by eliminating the need to use different types of bulbs for different types of illumination.

It is a specific objective of the present invention to provide an illumination system of the type described in which bulbs providing illumination are not visible to observers in the illuminated space.

It is an objective of the present invention in one form to provide for a fixture, which may be attached to a wall, ceiling or other architectural surface, which is of minimized thickness with respect to the proportion of the light captured from the source for distribution.

It is an objective of the present invention in a further form to provide for a fixture which is of minimized thickness with respect to the proportion of the light captured from the source for distribution by virtue of minimized axail dispersion so that the fixture which may be embedded in a wall, ceiling or other architectural surface.

It is a still further objective of the invention to provide a system of the type described in which inputs from more than one source may be combined, one input of which could be solar.

It is a still further specific objective in a the form of system of the type described to permit the combination of different light sources which may have differing "warm" or cool" spectra.

It is also an object of the present invention to provide illumination means of the type described which may be embodied in an low profile architectural devices with respect to a surface to which it is mounted.

It is a more particular object of the present invention to provide a system in which the axial dimension may be minimized while maintaining efficiency in capture of radiation by distribution optics that receive radially collimated light from collimation optics.

It is another object to provide illumination means of the type described in which the distribution optics may provide a plurality of different forms of illumination or separately directed volumes of light of a similar type of illumination.

It is also another object to provide illumination means of the type described in which the containment optics and or the distribution optics may be formed to receive and transmit a plurality of different forms of illumination or separately directed volumes of light of a similar type of illumination.

It is a further object of the present invention in one form to provide compound radial collimators to provide highly efficient capture of radiant flux form the source.

It is yet another object of the present invention to a system of the type described in which light having at least another forms of collimation provided for distribution in addition to radially collimated light so that different types of illumination, e.g. task or ambient, may be provided from one light distribution means.

It is another specific object of the present invention in one form to shape radially collimated light in a continuous lineal beam, whereby convention "scalloping of a light pattern produced by prior art distribution systems may be avoided.

It is also an additional object of the present invention for provide illumination systems of the type described in which collimation, containment and or distribution optics may be segmented, whereby additional ability for providing a plurality of separately shaped light segments is provided.

It is another object in illumination systems of the type described to spread illumination from an aperture in illumination means of the type described, whereby glare is reduced.

It is still another object to provide illumination means of the type described which can shape light to meet constraints of a particular environment by selection of interacting forms of collimation and distribution optics.

It is also an another object of the present invention to provide illumination systems of the type described in a panel isevenly illuminated and which can function as an artificial skylight.

It is also a further object in one form to provide light distribution means of the type described wherein light from more than one quasi point source may be mixed and distributed.

Briefly stated, in accordance with the present invention, there is provided an illumination means including radial light collimation optics, containment optics and distribution optics for shaping light to illuminate space. The radial collimation means is formed to shape light from a quasi point source in to a shape which may be viewed as a cylinder or as a disc extending in a radial direction and having a thickness in the axial direction. The containment optics contains and directs light efficiently to the distribution optics. The containment optics controls axial dispersion with respect to distance from the collimation optics. Light is contained within the axial dimenstion to limit axial dispersion. This provides the capability to maintain efficiency and, where desired, to minimize the axial dimension of the system of the present invention. Also, the size of thedistribution optics, particularly in the axial dimension may be minimized while still providing for maixmum capture of light. Distribution optics are radially outward of the collimation means. Containment optics may be a physical bridge between collimation optics and distribution optics. The containment means may be a structural member. The distribution optics may be concentric with the radial collimation means, or may comprise discrete elements. The distribution optics modulate light, directing and shaping it to fill selected spaces. Distribution optics may be formed to spread illumination from an aperture, whereby glare is reduced. Modifications may be made to the collimation optics to facilitate maximum capture of radiant flux from the source. In further forms, the collimation optics means is segmented to provide sectors of radiation for coupling to each of various forms of containment optics and distribution optics. The collimation optics may be segmented and may provide more than one form of collimation. Distribution optics may also be segmented. Further means may be provided for mixing and distributing light from more than one quasi point source so that waveband or other source characteristics may be mixed.

DESCRIPTION OF THE DRAWINGS

The means by which the foregoing objects and features of invention are achieved are pointed out in the claims forming the concluding portion of the specification. The invention, both as to its organization and manner of operation, may be further understood by reference to the following description taken in connection with the following drawings.

Of the drawings:

FIGS. 1 through 3 are each an elevation in cross section illustrating a different form of collimation optics;

FIG. 4 is an elevation is cross section illustrating collimation and containment optics;

FIG. 5 is an elevation is cross section illustrating optics performing a number of functions;

FIGS. 6, 7, and 8 are an axonometric view and plan views respectively of different forms of segmented collimation optics;

FIGS. 9, 10 and 11 are respectively an axonometric view, partially broken away, and a plan view and an elevation, each in cross section, illustrating a compound beam collimator including segmenting in the collimation optics;

FIGS. 15, 16 and 17 are each an axonometric view, partially broken away, illustrating a separate embodiment utilizing light bridging means extending from an element in collimation optics;

FIG. 18 illustrates containment optics including two parts, a solid bridge linking collimation optics and distribution optics as well as a containment ring lens;

FIG. 22 is an illustration similar to that of FIG. 20 illustrating an alternative embodiment in which distribution optics are reflective rather than refractive;

FIG. 23 is a an elevation in cross section of a collimation and distribution means employing a light containment optics between the collimation and distribution optics;

FIGS. 23A and 23B illustrate alternate forms of exit apertures from distribution optics;

FIG. 24 is an axonometric view of a system mounted to a transmissive architectural panel;

FIG. 26 is an axonometric view with a diametric cross section illustrating a system similar to that of FIG. 23 which utilizes a collimation optics of FIG. 5;

FIGS. 27 and 28 are a cross sectional elevation and an axonometric view of a system with segmented distribution optics suitable for installation to an architectural panel;

FIGS. 29a and 29b illustrate alternative light exit means for inclusion in the embodiment of FIGS. 27 and 28;

FIGS. 30 and 31 are a cross sectional elevation and an axonometric view of another form of system with segmented distribution optics suitable for installation to an architectural panel;

FIG. 33 illustrates alternative light exit means for inclusion in the embodiment of FIGS. 30 and 31 for changing the shape of light directed from the linear distribution optics segments;

FIGS. 34 and 35 are a cross sectional elevation and an axonometric view of another form of system with multiple, concentric distribution optics members of differing axial dimensions suitable for installation to an architectural panel;

FIGS. 37 and 38 are a cross sectional elevation and an axonometric view, partially broken away, of another form of system with reflective distribution optics members;

FIG. 39 is a partial detail view illustrating alternative exit means for the light distribution means of FIG. 37;

FIGS. 43 and 43A are a cross sectional elevation and an axonometric view, partially broken away, of another form of system with reflective containment optics and refractive ring distribution optics members;

FIG. 45 is a cross sectional elevation of an embodiment incorporating concentric refracting rings for segmenting transmitted light in the distribution optics;

FIGS. 46 and 47 are a cross sectional elevation and an axonometric view of another form of system suitable for installation to an architectural panel with segmented reflective distribution optics;

FIGS. 48 and 49 are a cross sectional elevation and an axonometric view of another form of system suitable for installation to an architectural panel with segmented reflective distribution optics wherein shadow eliminating light patterns are provided;

FIGS. 50 and 51 are each a perspective illustration of a system according to the present invention providing both radial and cylindrical collimation and suitable for inclusion in architectural panels as well as having the ability to be suspended in space and wherein containment means are shaped to match the output from collimation means;

FIG. 55 is a perspective view of a system similar to that of FIGS. 52–54 but wherein multiple forms of collimation are provided;

FIG. 56 is a partial detail view of FIG. 55, partially broken away, illustrating collimation optics means for delivering light;

FIG. 57 is an axonometric view of an embodiment in which distribution optics comprises a parabolic or ellipsoidal reflector, which may have a flat, spherical or aspherical surface in the axial, or vertical, dimension;

FIG. 58 is a plan view of an embodiment in which the collimator in collimation optics is modified to provide conventional collimation within the segment which is not reflected;

FIG. 59 is a cross sectional plan view of an embodiment in which a reflector intercepts forwardly directed radially collimated light and redirects it toward the distribution optics;

FIG. 60 is a cross sectional plan view of a system including a horizontally disposed lamp providing radiant energy.

FIG. 64 is an axonometric illustration of an embodiment which can be contained in the envelope of a rectangular parallelipiped and comprises multiple light sources;

FIGS. 65, 66 and 67 each show different forms of exit means that may be included in the embodiment of FIG. 64;

FIG. 68 is an alternate form of the embodiment of FIG. 64 continuous contours may be used to shape the boundary of the distribution optics and exit means;

FIG. 69 is an axonometric view, partially broken away wherein distribution optics comprises a shaped, axially extending band surrounding the radial collimation means;

FIGS. 70 and 71 are a cross sectional elevation and an axonometric view, partially broken away of another form of system suitable for installation to an architectural member comprising a ceiling panel; and FIGS. 72 through 75 are each a view of means for mixing light from more than one source for distribution in accordance with the present invention.

DESCRIPTION OF THE PREFERRED EMBODIMENTS

Figure 12:
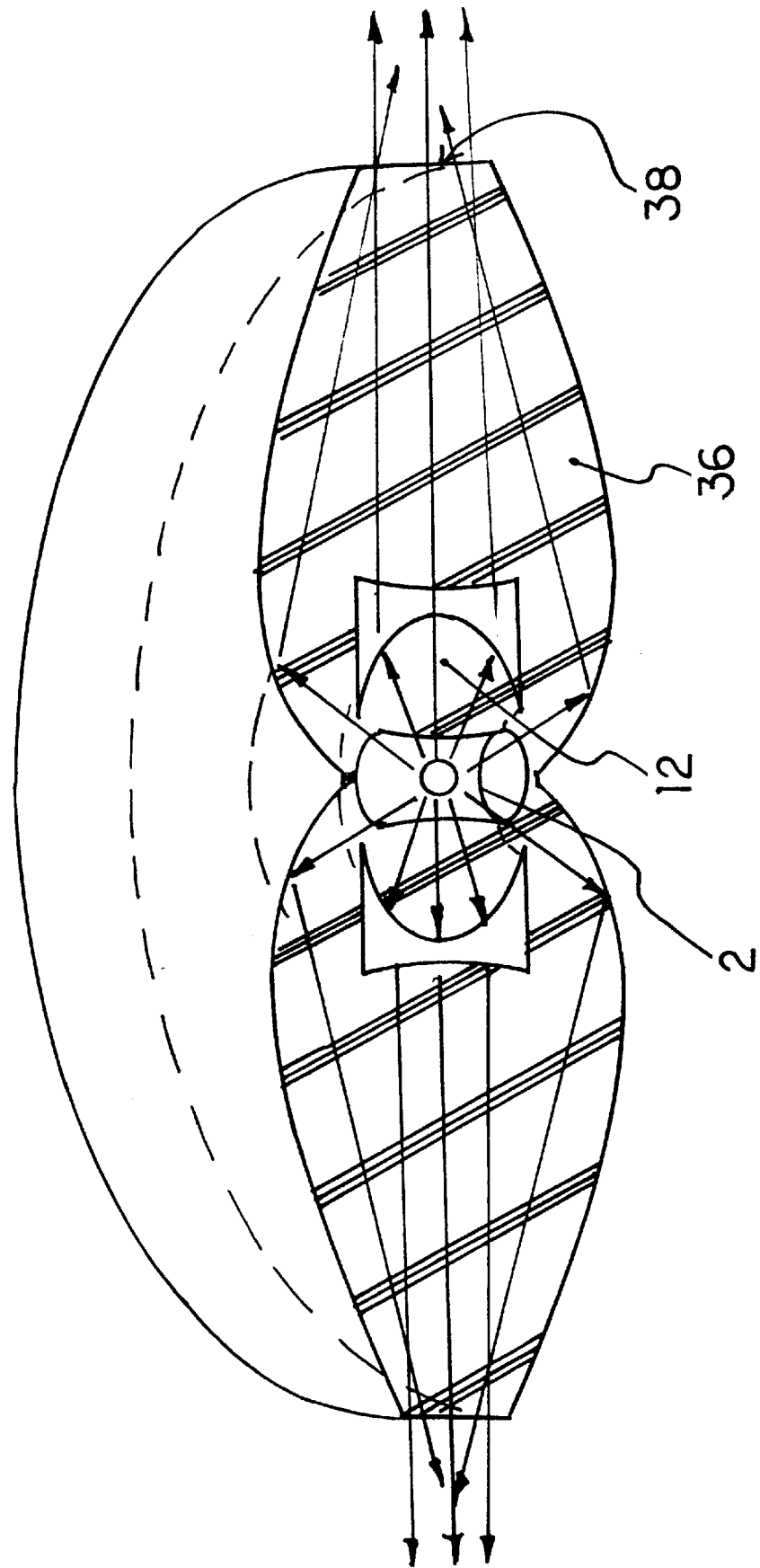
FIG. 12 is an axonometric view, partially broken away, of a system comprising an alternative form of containment optics.

The present invention provides for use of radially collimated light for illumination of space. The use of shaped, radially collimated light is in contrast to the common prior art use of downlights or other lighting devices providing only cylindrically collimated light. Radially collimated light lends itself to shaping by distribution optics. The present invention will provide for many forms of distribution and shaping of radially collimated light. In a further form, both radially and cylindrically collimated light may be distributed to meet specific lighting requirements. In an additional form of the invention, the collimation optics may provide a segmented output with selected segments having differing rates and shapes of divergence. All or less than the entire angular extent of the source may be radially collimated.

Containment optics limit dispersion of light in an axial dimension with respect to radial distance from the source and the collimation means. Containment optics controls divergence and efficiently directs light from collimation optics to distribution optics. It also may structurally connect collimation and distribution optics and further may unify structurally the collimation optics and distribution optics to create an architectural member. Containment optics can be in the form of a refractive ring, internally reflective surfaces in a hollow member or totally internally reflective surfaces in a solid, a structural member or an architectural surface.

Distribution optics transform the radially collimated light into the desired shape for spatial illumination. The present specification begins with a description of collimation optics prior a description of the interactions with containment means and distribution optics. A radial collimator, including collimation optics means, is provided. Substantially omnidirectional light is directed into a radial degree of freedom of freedom over an axial range corresponding to the axial range over which an entrance aperture of the collimator intercepts light from the source. Distribution optics means receive light from the collimation optics for reshaping and distribution.

As described in my above-identified application, a ring collimator can have a cross section of an asphere or a Fresnel lens. A particular type of ring can be matched to the structural requirement of a particular modulator included in distribution optics. The distribution device comprised of the distribution optics is remote from the collimation optics. A conveyance or transmission area is intermediate the collimation and distribution optics. While there is latitude in the degree of remoteness between the collimation and the distribution optics, the it is important that the containment optics interacts to capture the collimated light and direct to the distribution optics so that efficiency is maintained.

As in standard cylindrical aspheres, efficiency is determined by the following: the "f" number of the lens itself and the ratio H/P, the height H of the ring lens and the size P of the radiant arc comprising the quasi-point source in the lamp, and efficiency of the lens.

It is important to note that quasi point sources currently available, are in fact not point sources. It is convenient to illustrate radially collimated rays from a quasi point source as being parallel. Within some broad degree of precision, this is true. However, in practical applications, a degree of divergence is present. This divergence creates limiting factors with respect to radial dimensions and efficiencies of prior art light distribution systems. The present invention recognizes and addresses this problem.

Initially, various embodiments of collimation optics are discussed. In the Figures, the same reference numerals are used to denote the same elements. The lines with arrowheads indicate the direction of light. FIGS. 1 through 3 are each an elevation in cross section illustrating a different form of collimation optics comprising a collimator 10. FIG. 4 illustrates a compound ring lens structure performing further functions. FIG. 5 is an elevation is cross section illustrating compound collimation optics. In the figures, the same reference numerals are used to denote corresponding elements. There are several types of a ring lens 12, also referred to as a collimating ring 12, or ring 12, that can be used in collimation optics. A highly desirable form is one having a minimum "f" number. "f" number is ratio of the radius from a radiant energy quasi point source 1, here comprising a metal halide lamp 2, to the face of the ring 12 divided by the height of the ring 12. Here, height is dimension in the axial direction. The axis defining the axial direction is an axis 11 about which the ring 12 is concentric. Preferably, the arc provided by the lamp 2 lies on the axis 11. A radially inner surface 14 of the ring 12 is close enough to the source 1 to catch a large part of the radial flux of the lamp 2. A value of "f" <1 is commonly acceptable. Light exits from a radially outward surface 16. The ring 12 may have a section that may be aspheric, spherical, or may comprise a Fresnel lens that is spherical or aspheric. This first type of collimator allows for a portion of the radial flux of the lamp to leave the confines of the ring. In this case the light may be directed in another pattern separate from the radial pattern.

The efficiency and accuracy of the front surface and the back surface of the ring lens 12 affects efficiency of the collimation optics. The front surface is the outer surface 16, which is an exit aperture for collimation optics, and the back surface is the inner surface 14, which is an entrance aperture of the collimation optics. Lens surface efficiency and accuracy are functions of lens manufacture and do not form a part of the present invention. They relate to smoothness of surface and accuracy of the shape provided by the lens manufacturer. The lens also is affected by the clarity of the glass from which it is constructed. They provide for uniformity of cross section of the transmitted light beam. They are relevant to the lens selection one skilled in the art would make to implement the present invention.

In the embodiment of FIG. 2, an inner surface 14' is provided which is convex, and improves upon light collection compared to the embodiment of FIG. 1. As illustrated in FIG. 3, an outer surface 16' of the lens ring 12 may have a Fresnel cross section. When using a large quasi point source, the use of a solid aspheric ring as in FIG. 1, in order to keep the ratio H/P high, the ring lens might have to be inordinately large, difficult to handle and expensive. A Fresnel ring provides for a larger effective height while maintaining a limited actual height.

Multiple lens collimators may be used to increase efficiency, as illustrated in the embodiment of FIG. 4, which also includes containment means. A compound ring lens 12 comprising, for example, first and second rings 12a and 12b, may be used. Unlike aspherical rings, a multiple lens ring may be used to form or to cause the radiating beam to be convergent. This can be significant in some forms in that it enables the use of distribution optics of reduced size in the axial dimension. In the embodiments of FIGS. 1 through 4, depending upon the "f" number, and the configuration of the quasi point source, some percentage of the radiant flux is allowed to leave through the central apertures of the ring in a vertical degree of freedom. In some applications, this is highly desirable in that downlighting is provided in addition to radial collimation.

The embodiment of FIG. 5 illustrates a compound radial collimator which employs two simultaneously occurring methods of radial collimation. The first method is performed by the spherical or aspheric ring section 12. The other is performed by a refracting ring 20 which is internally reflective. The refracting ring 20 has a parabolic or ellipsoidal section. The inner diameter of the ring 20 is substantially in radial registration with the ring 12, and the ring 20 surrounds the ring 12 in the axial degree of freedom. By combining components to provide a composite design, the entire radial flux of the lamp 2 may be captured for radial projection. The H/P ratio has been increased by adding a combination of refracting and/or reflecting surfaces in registration with the central apertures of the ring lens.

FIGS. 6 and 7 are an axonometric illustration and a plan view respectively of a segmented collimation ring. First and second ring lens segments 21 and 22 concentric with the axis 11 lie on selected arcs. These arcs may be symmetrical about the axis 11. Remaining segments around the source 2 are each subtended by a conventional lens 24 and 26. The lenses 24 and 26 may each be spherical, aspherical or a flat window. In this embodiment, distributed light from the lens ring segments 21 and 22 is radially collimated. The light from the lenses 24 and 26 is cylindrically collimated, and may be provided to lineal distribution means. Examples of improved lineal distribution are disclosed in my copending patent application 08/006,641 entitled Lineal Light Distribution and my U.S. Pat. No. 5,046,805, granted Sep. 10, 1991 entitled Tapered Optical Waveguides for Uniform Energy (Light) Including Energy Bridging and 5,130,908 granted Jul. 14, 1992 and entitled Architectural Member Comprising Illumination System, the disclosures of which are incorporated herein by reference. FIG. 8 is a plan view illustrating that a different number of segments of radial collimation means, here 21, 21a, 22 and 22a may be provided. In this embodiment, each round lens interspersed between two ring lens segments is truncated in order to achieve efficiency in terms of catching a majority of the radial flux. As further illustrated, one or more refractive segments may be replaced with a reflector 28 directing radiant flux back through the quasi point source to amplify the lumen output of the refracting lens which is at an angular distance of 180 degrees from the reflector. The substitution may be done in ring sections or the common lens sections.

FIGS. 9, 10 and 11 are respectively an axonometric view partially broken away of another form of the collimator 10, a plan view in cross section taken along lines X—X of FIG. 9, and a cross section in elevation taken along lines XI—XI of FIG. 9. This embodiment is a further form based on the embodiment of FIG. 5. As in the embodiment of FIG. 5, the compound optical radial collimator 10 includes a collimating ring 12, and refracting ring 20 in order to captures substantially 100% of the lamp 2's radial flux. Additionally, part of the radiant flux could be collimated by one or more of the lenses 26 for lineal distribution by other means (not shown) as discussed above with respect to FIGS. 6, 7 and 8. In this embodiment, the ring lens 12 is not segmented. Instead, radial bores 30 are each formed extending through the ring section 12 to receive each lens 26. The lenses 26, which may be spherical or aspheric and preferably piano-convex, are each mounted in a bore 30 with its plane surface adjacent the inner diameter 14 of the ring 12. The diameter of each lens is selected preferably so that a small "f" number is provided for the lens portions of the collimator as well as the ring portions.

Another type of collimator is illustrated in FIG. 12, which is an axonometric view broken away to show an elevation in cross section. The embodiment of FIG. 12 may also be viewed as a further form of the embodiment of FIG. 5. A third element 36, which is a ring section 36, radially surrounds the rings 12 and 20 to receive the radiant flux projected therefrom and contain it in the axial dimension. In the embodiment of FIG. 12, the rings 12, 20 and 36 are formed to be unitary. However, they may also be formed of discrete sections. The ring 36 has a taper so that as distance from the source 1 increases in the radial direction, thickness of the ring 36 decreases in an axial direction. In a preferred embodiment, the axial thickness of an exit aperture 38 is one third the axial thickness of the first ring 12. The axial thickness of the ring 36 is substantially less than the axial dimension of the first ring 12. This is done for the purpose of coupling light from a ring collimator 10 so that the ring 36 acts as containment optics, and the exit aperture 38 comprises distribution optics.

Figure 13:
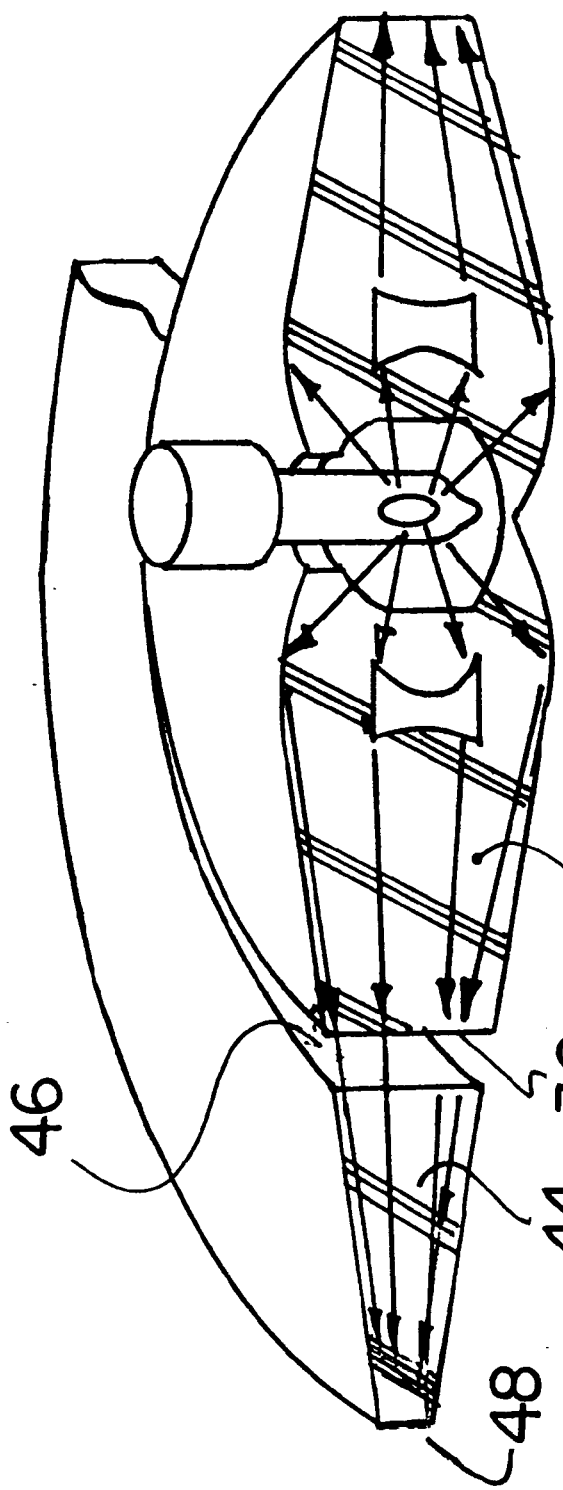
FIG. 13 is a view similar to FIG. 12 incorporating further containment optics in light distribution means.
Figure 14:
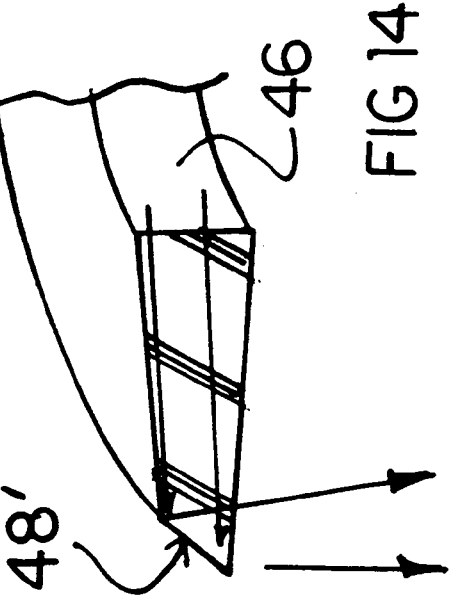
FIG. 14 is a partial, detail view of alternative light distribution means for use in the embodiment of FIG. 13.

The ring 36 may also be a conveyance means delivering light to further distribution optics. An example of this construction is illustrated in FIG. 13, which is an axonometric view partially broken away and illustrating a cross sectional elevation. The further distribution optics is an outer ring 44 having a radially inner surface 46 and an exit means comprising the face 48 from which light exits. Light leaving the conveyance means comprising the ring 36 leaves the exit aperture 38 and enters the ring 44 through the inner surface 46. The outer face 48 could be sand blasted or otherwise treated, as with hydrofluoric acid to provide diffused light. In another alternative form, upper and lower surfaces of the ring 44 may comprise optically modulating surfaces which allow light to leak out depending on its degree of collimation. The upper and lower surfaces may be formed to be specular in order to convey rather than diffuse light. In the embodiment of FIG. 14, which is a partial detail view, the exit means comprises a face 48' which is not perpendicular to exit light rays.

FIG. 15 is also an axonometric view broken away to illustrate an elevation in cross section. Another form 50 of ring collimator 10 includes a collimation ring section 12 that is spherical or aspheric and a distribution optics 59 comprising a lens ring 60 that is concentric with the collimation ring 12. The secondary ring 60 has a convex or biconvex section and acts as containment means and has a radially outer exit aperture 61. The first and second rings 12 and 60 are joined by a radially extending, annular bridge portion 63 having substantially the same index of refraction. The bridge 63 utilizes light that is already parallel (collimated) and provides for direct transmission with substantially no losses at the transition interfaces to and from ring members 12 and 60. The bridge 63 is a component providing structural and optical connection between adjacent rings. The bridge section 63 need have no minimum radial length. The bridging may be done with an axially central portion which also forms the axially central portions of the other light distributing components.

The use of concentric rings 12 and 60 minimizes divergence of the radial beam. This operation is superior operation compared to that provided by the use of compound lenses for collimating. It known that the use of compound lenses is a prior art alternative for the purpose of minimizing divergence. However, compound lenses are often inefficient due to reflective and refractive losses at each of many surfaces. In accordance with the present invention, divergence is minimized while transmission losses are also minimized. The lens rings 12 and 60 are of substantially equal axial dimensions and spaced a radial distance apart so that light is contained in the axial dimension. Therefore, efficiency is maintained in that substantially all the radiant flux of the lamp 2 is directed to the exit aperture 61 while the axial dimension of the light distribution system is minimized.

FIG. 16 represents an embodiment formed with an additional outer ring 66 that is unitary with the collimator 50. Light from the source enters a convex surface at the inner face 14' of the inner ring 12. The entrance means 14' at the inner diameter of the ring collimator 50 may be a combination of concave and convex surfaces. The embodiment of FIG. 17, a partial detail view, may provide for a higher degree of radial collimation due to the formation of the entrance means 14". The bridging may be done with an axially central portion 63 also forming the axially central portions of the other light distributing components.

FIG. 18 is an axonometric view of another form of light distributing ring in with an outer ring 66'. An annular disc 64 projects radially in registration with the position of the bridge portion 63. An exit aperture 38' has surfaces comprising a portion of the distribution optics. Projecting from either side of the disc 64 are prism rings 65 which are concentric and of varying diameter for intercepting radially directed light from the collimator 50 and directing the light away from the distribution means. The bridge portion 63 may be viewed as being eliminated or as having a zero length. The containment optics includes the bridge 63 and disc 64 and the second lens ring 60.

Figure 19:
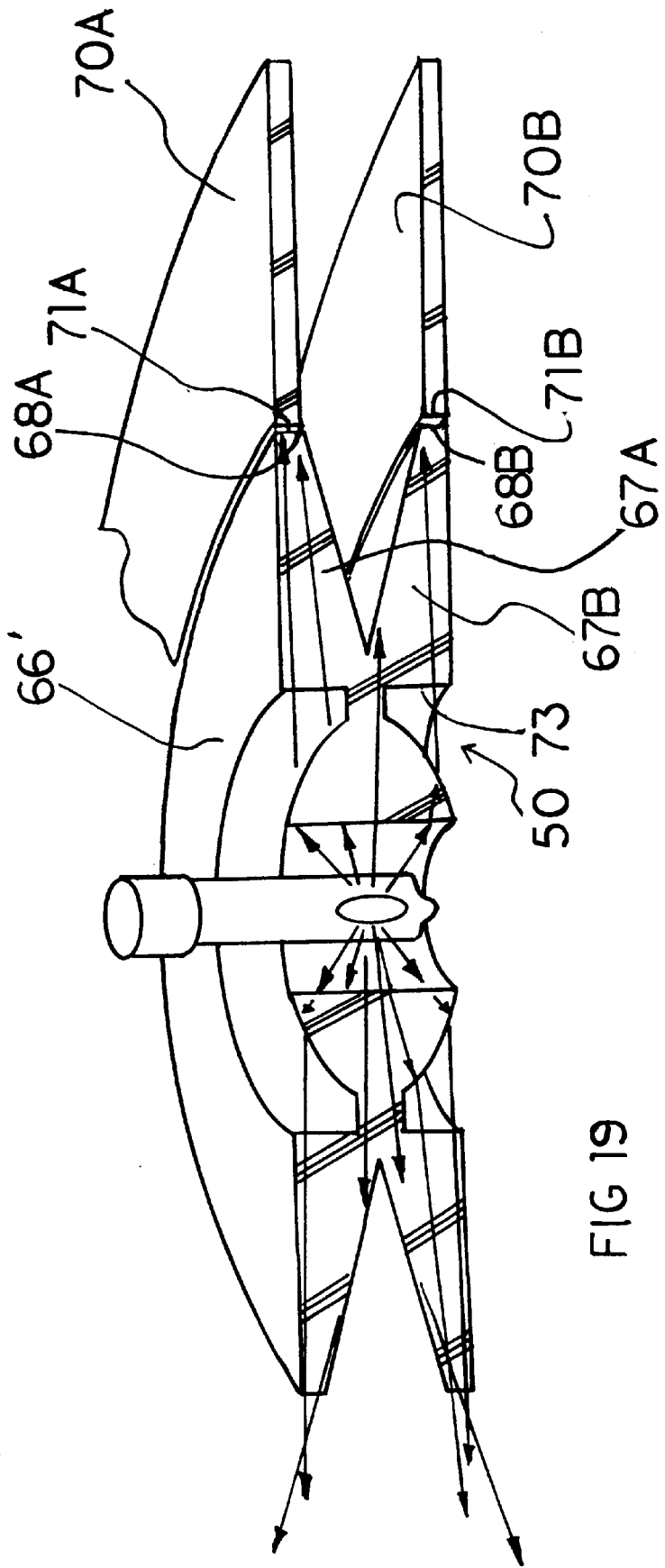
FIG. 19 illustrates physical bridging from collimation means to containment means.

FIG. 19 illustrates an embodiment in which a ring element 66' is provided which is also unitary with the collimation optics 50. A first and a second wedge element 67a and 67b may each diverge from a base 73 comprising an entrance aperture at a radially inner end of the ring 66'. The wedge elements 67a and 67b have radial exit apertures 68a and 68b respectively. The substantial majority of radially collimated light is directed for distribution and is split into two parallel, radial discs. It is possible to optically feed a plurality of parallel plates, here, first and second plates 70a and 70b, which will be light conveyors, distributors, and/or distribution optics, depending on how they are used. The plates 70a and 70b each have radially inner surface extending in an axial degree of freedom comprising an entrance aperture 71a and 71b respectively in registration with the exit apertures 68a and 68b from containment means. The ring 66' is a light dividing containment ring with both the entrance aperture 73 and bridge 63 providing inputs.

Figure 20:
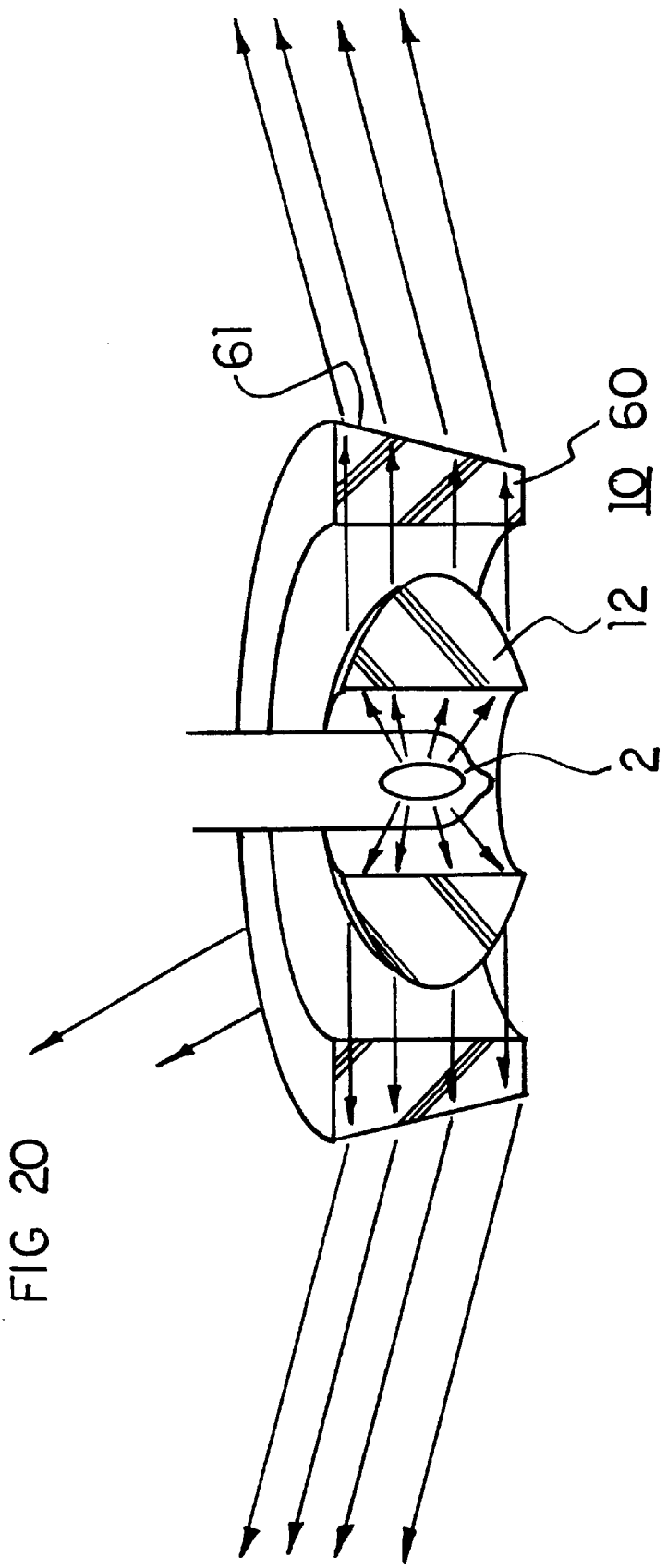
FIG. 20 is an axonometric view with diametric cross section of a compact system suited for distributing light on a surface for secondary illumination.
Figure 21:
FIG. 21 is an elevation of the embodiment of FIG. 20 installed to an architectural surface.

In FIG. 20, another axonometric view, broken away to show a cross section at a diameter, the secondary ring 60 has an outer refracting surface 61. The smallest variation in the angled refracting surface 61 has an inordinate effect on the divergence of the distributed light. The wedge shaped optics ring 60 redirects the light it receives from a radial direction toward an adjacent architectural surface, resulting in a radial pattern of indirect illumination. The embodiment of FIG. 20 shows that space may be indirectly lighted by a radial collimator mounted within a refractive wedge ring to redirect the radial beam into a Belleville washer shape of selected thickness. This shape can also be described as a conical cylinder or a solid of revolution derived from rotating a parallelogram around an axis. The light is delivered to a ceiling, wall or other surface for indirect distribution. Prior art fixtures must be displaced from a ceiling in order to "wash" the surface with light. The present invention, as illustrated in FIG. 21, which is an elevation, permits a fixture 78 incorporating the system 10 to be flush with a ceiling 79. The lamp 2 may be mounted so that it is not visible in use. Glare is thus reduced compared to incandescent or fluorescent lamps.

In the embodiment of FIG. 22, an axonometric view partially broken away, the distribution optics 59 comprises reflective means. Coaxially mounted annular plates 74, in the present forms, two plates 74a and 74b intercept light transmitted from the lens ring 12 for further distribution.

FIG. 23 is a cross sectional elevation of an embodiment wherein the distribution optics 59 comprises a triangular prism ring 80. Either an aspherical or a composite radial collimator ring lens 12 may be used. The system 10 is mounted in a shallow cylindrical fixture 85 havingan upper surface 86 having a reflective inner surface 88 extending radially around the source 1 and positioned axially immediately above the prism ring 80. In FIG. 23, the prism ring 80 has a surface 89 directing light to an exit aperture 90, which is flat. FIGS. 23A and 23B each respectively illustrate exit apertures 90' and 90" which are concave and convex. This device substitutes for what we would normally consider to be a downlight. A downlight generally provides a single cone.

FIG. 24 illustrates in axonometric form the embodiment of FIG. 23 with the upper surface 86 removed. Radially disposed structural ribs 93 are mounted on the upper surface of a transmissive architectural member, which may be a transparent ceiling panel 94. The panel 94 acts as containment optics and includes exit aperture means. Containment optics limit divergence in the axial direction.

The containment optics may be a hollow chamber with internally reflecting surfaces or a solid member utilizing total internal reflection. Containment optics may end at an entrance aperture of distribution optics to provide for optical functioning of the system and to provide for mechanical connection of the collimation and distribution optics. The containment means may extend radially beyond the distribution optics, for example to form a shape such as serving as an architectural member.

Figure 25:
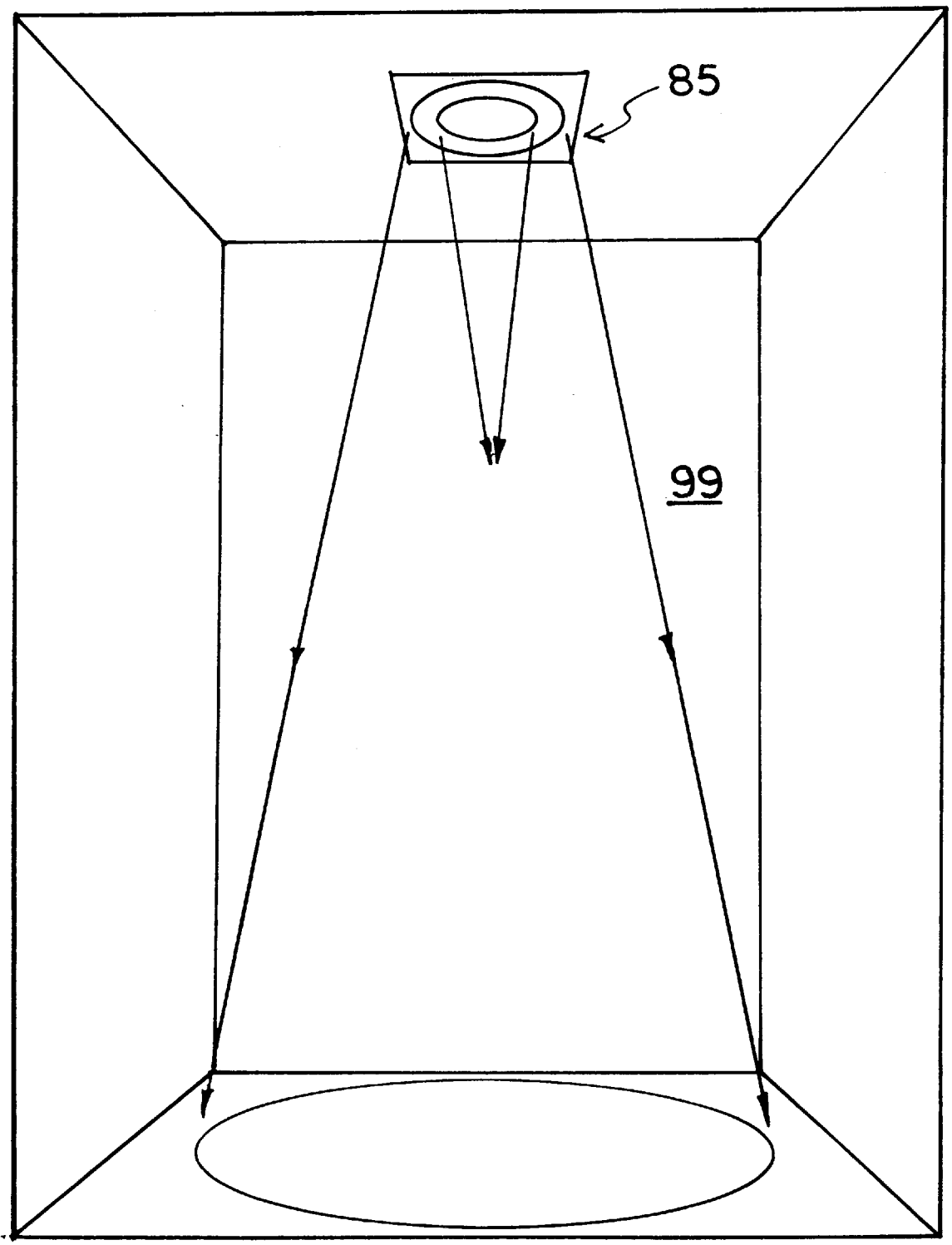
FIG. 25 is a perspective view illustrating an embodiment according to either of FIGS. 23 or 24 in use.

As seen in FIG. 25, a perspective view of a room 99 incorporating the embodiment of FIG. 23 or 24, the resulting light distribution is in the form of a cylinder whose walls are diverging. Rather than forming a single cone as in a downlight, the resulting pattern is the integral of wedges each originating at a point on the refracting ring. The distribution here is in the form of a cylinder of walls of increasing thickness with distance from the modulation means. The section is a triangle. The divergence of the cylindrical wall thickness of the triangular walls of the illumination pattern is controlled by the internally reflective surface 88 in the distribution optics 59. FIG. 25 shows a potential photometric distribution of this optical combination in perspective. Photometrics could be shown in the form of geometry or brightness of the beam at different location at varying distances from the source and varying in position across the beam. A downlight has a focal point plus light spread from uncaptured rays.

The illumination in FIG. 25 comprises the above-described shape of a cylinder with walls diverging at an outer diameter and converging at an inner diameter. This shape may also be explained as a truncated cone. A second cone projects downwardly from the plane at which the first cone is truncated. That second cone has no light in it. Coverage is dependant on the rate of divergence of light leaving the secondary optic. Floor coverage will vary also vary with the shape of the exit means 90 as illustrated in FIGS. 23A and 23B. The f number of the radially collimating portion and the conventional lens portions are substantially equal. Consequently, efficiency in capturing light from the source is achieved. Such an apparatus functions to distribute radially collimated light for modulation as described below. Conventionally collimated light from the lenses is distributed for a second and diverse type of illumination. This type of illumination may be in the form of a projected spotlight or in the form of lineally divergent ring of illumination. The divergence between the cylinder walls may be controlled by changing or by making any or all of the surfaces of the secondary prism ring convex, concave or a combination of both.

The embodiment illustrated in FIG. 26, again, an axonometric view broken away along a diameter, illustrates an embodiment similar to that of FIG. 24, but wherein the collimation optics 10 comprises compound collimation means as in the embodiment of FIG. 5.

FIGS. 27 and 28 illustrate in cross sectional and axonometric form respectively a further form of distribution means in which the secondary optical ring 59 may be geometrically segmented into segments 100 and 102. The segments 100 and 102 of the ring 59 may continuously surround the radial collimator 12 while the segments 100 lie on a first concentric circle, and the segments 102 lie on another concentric circle. Segments in differing concentric bands may be used to provide different rates of divergence. For example, the outer ring segments 102 may a concave exit aperture as seen in cross section as in FIG. 29a to provide a more rapid rate of divergence. The inner ring segments 100 may have a convex exit aperture 90" as seen in cross section in FIG. 29b to provide a more concentrated illumination on the opposing surface at which the light strikes.

Figure 32:
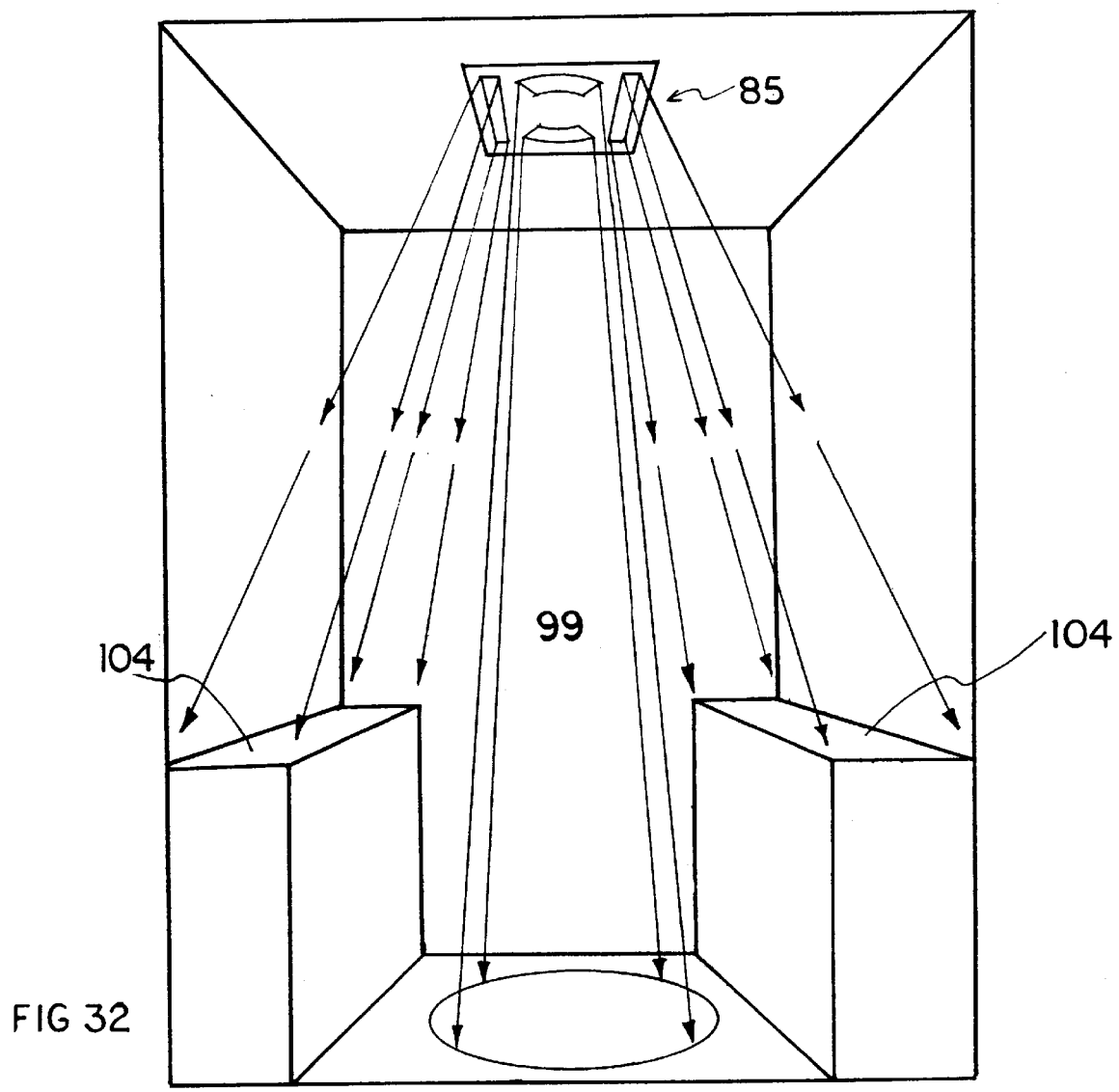
FIG. 32 is a perspective view illustrating an embodiment according to either of FIGS. 30 and 31 in use.

FIGS. 30 and 31 are a cross sectional elevation and an axonometric view of another form of system with segmented distribution optics suitable for installation to an architectural panel. FIG. 32 is a perspective view illustrating an embodiment according to either of FIGS. 30 and 31 in use. In the embodiments of FIGS. 30 through 32, outer segments 102' are non-concentric. They are straight. This embodiment is suited for redistributing light for specific tasks. In FIG. 32, one such specific task is illustrated. It is desired to illuminate the center of the room 99 as well as to direct illumination to two opposed work surfaces 104 in the form of lineal bands of light rather than found cones. In this case, light is shaped, or contoured to fit the surface onto which it is projected.

In FIG. 33, which is a partial detail view of an alternative form of distribution optics 59, the radially inner surfaces of the distribution optics may be faceted, resolved into facets 106, each subtending a selected angular extent and each at a selected angle to the vertical, to further shape the resulting light pattern. Such faceting will prevent the sideways light scattering. Faceting provides surfaces perpendicular to incident light so that the face angle of the prism is relatively perpendicular to the radially collimated light. In this manner, the angle of incidence is minimized. The distribution optics further aid the shaping of the lineal light pattern.

Figure 36:
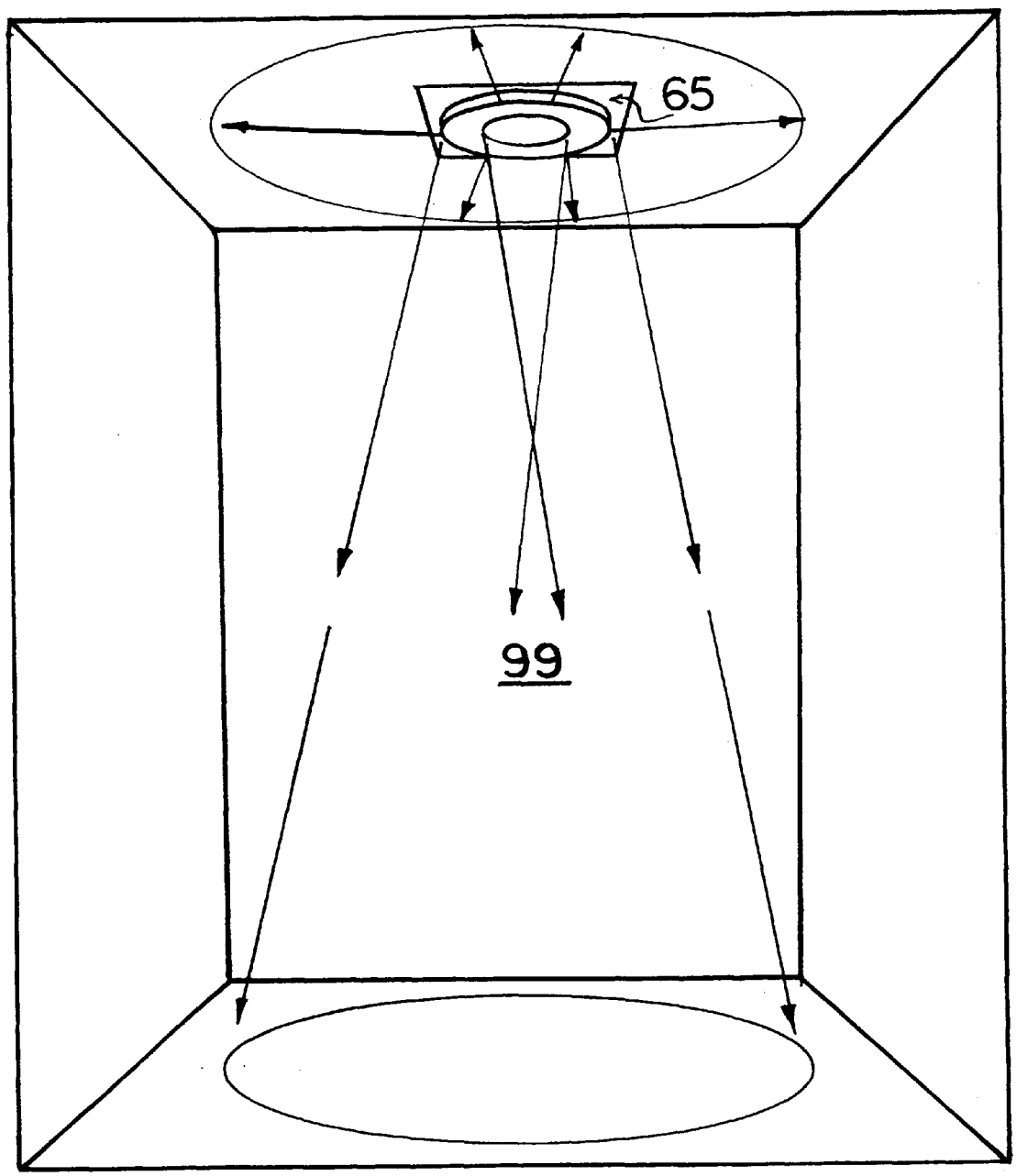
FIG. 36 is a perspective view illustrating an embodiment according to either of FIGS. 34 and 35 in use.

FIGS. 34 and 35 are a cross sectional elevation and an axonometric view of another form of system with multiple, concentric distribution optics members of differing axial dimensions suitable for installation to an architectural panel 94, which in part contains the light within the axial dimensions. FIG. 36 is a perspective view illustrating an embodiment according to either of FIGS. 34 and 35 in use. In FIGS. 34 and 35, a combination of features of FIG. 20 and FIG. 22 are used. The light from the radial collimator 10 is in effect divided in an axial direction and directed toward two secondary optical rings 106 and 108 comprising the distribution optics 59 and intercepting a differing portion of the axial extent of the radial collimated light. The ring 106 has a canted outer surface 107 to create a canted disc as in FIG. 20, while the ring 108 has an internally reflective surface 109 formed to create a cone as in the embodiment of FIG. 24. The illumination directed from the outer ring 106 will be indirect since it will foreseeably hit an adjacent architectural surface prior to illuminating persons or things in a room. In FIG. 36, both direct and indirect illumination of the area beneath the lighting panel is provided. A radially extending plate 105 may be placed against the axially inward surface of the ring 108 so as to further comprise segmented containment means.

FIGS. 37 and 38 are a cross sectional elevation and an axonometric view, partially broken away, of another form of system with reflective distribution optics members; FIG. 39 is a partial detail view illustrating alternative exit means for the light distribution means of FIG. 37. In FIG. 37, the radial illumination from the collimator 10 is further controlled by reflective discs 110 and 112 which comprise a fixture containing the light distribution system. The disc 110 forms a shallow cone intermediate the collimation optics 12 and the distribution optics 59 and acts as light containing means which reflects incident light to the distribution optics 59. The disc 112 surrounds and further concentrates the light in the distribution optics 59, in this case on to a reflective ring comprising the inner surface 113 of the disc 112. The reflective ring may or may not be constructed as part of the shallow reflective cone. As seen in FIGS. 37 and 38, light is modulated by reflectors rather than refractors. In FIG. 39, a straight, canted reflective surface 113' is provided rather than a continuously curved surface.

Figure 40:
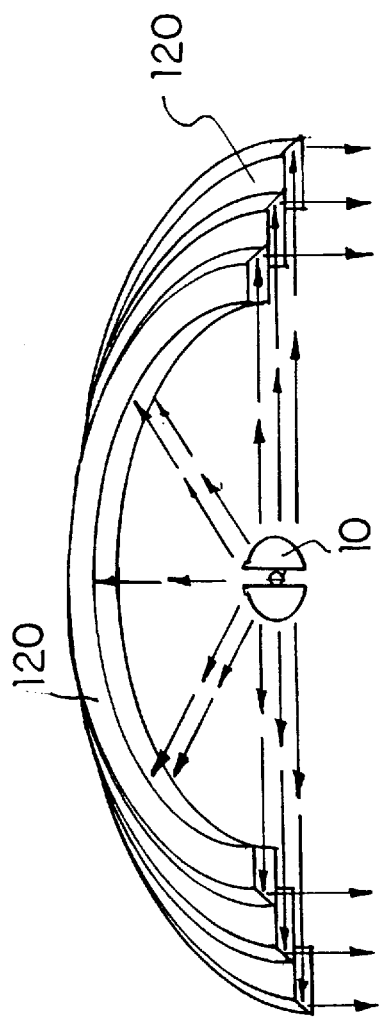
FIGS. 40, 41, 42 are each an axonometric view with diametric cross section of a separate embodiment of distribution optics containing multiple light directing elements, with FIGS. 41 and 42 illustrating solid containment optics.
Figure 41:
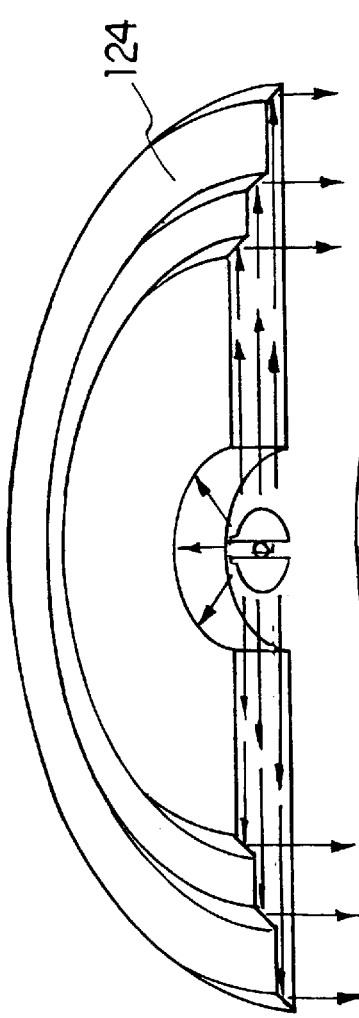
Figure 42:
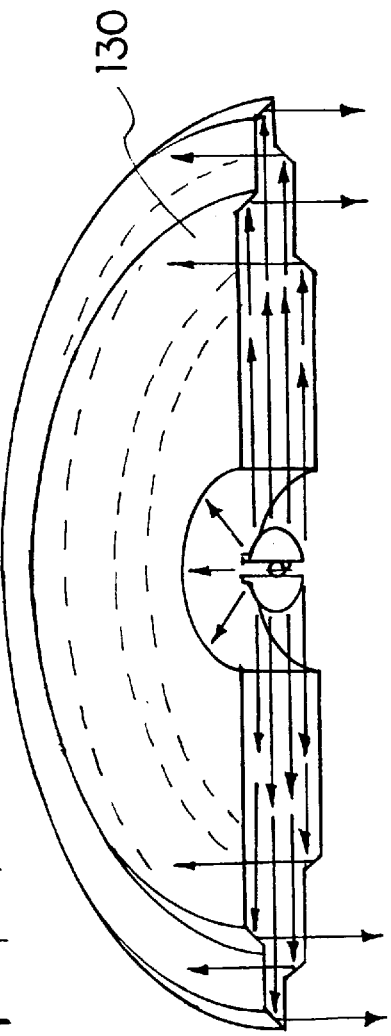

FIGS. 40, 41, and 42 are each an axonometric view with diametric cross section of a separate embodiment of distribution optics containing multiple light directing elements. In FIGS. 40, 41 and 42, further forms of distribution optics 59 are illustrated. FIG. 40 shows axially stacked concentric refractive rings 120 of differing diameters. FIG. 41 shows a single, stepped refractive disc 124 which may be considered to be similar to a plurality of rings 120 formed unitarily with a common inner diameter. FIG. 42 shows a single stepped refractive disc 130 with successive internally reflective surfaces on alternate sides of an axial centerline. This fixture may be suspended as a pendant lighting fixture and project rings of divergent light towards a ceiling and towards a floor simultaneously. FIGS. 41 and 42 disclose solid containment means.

Figure 44:
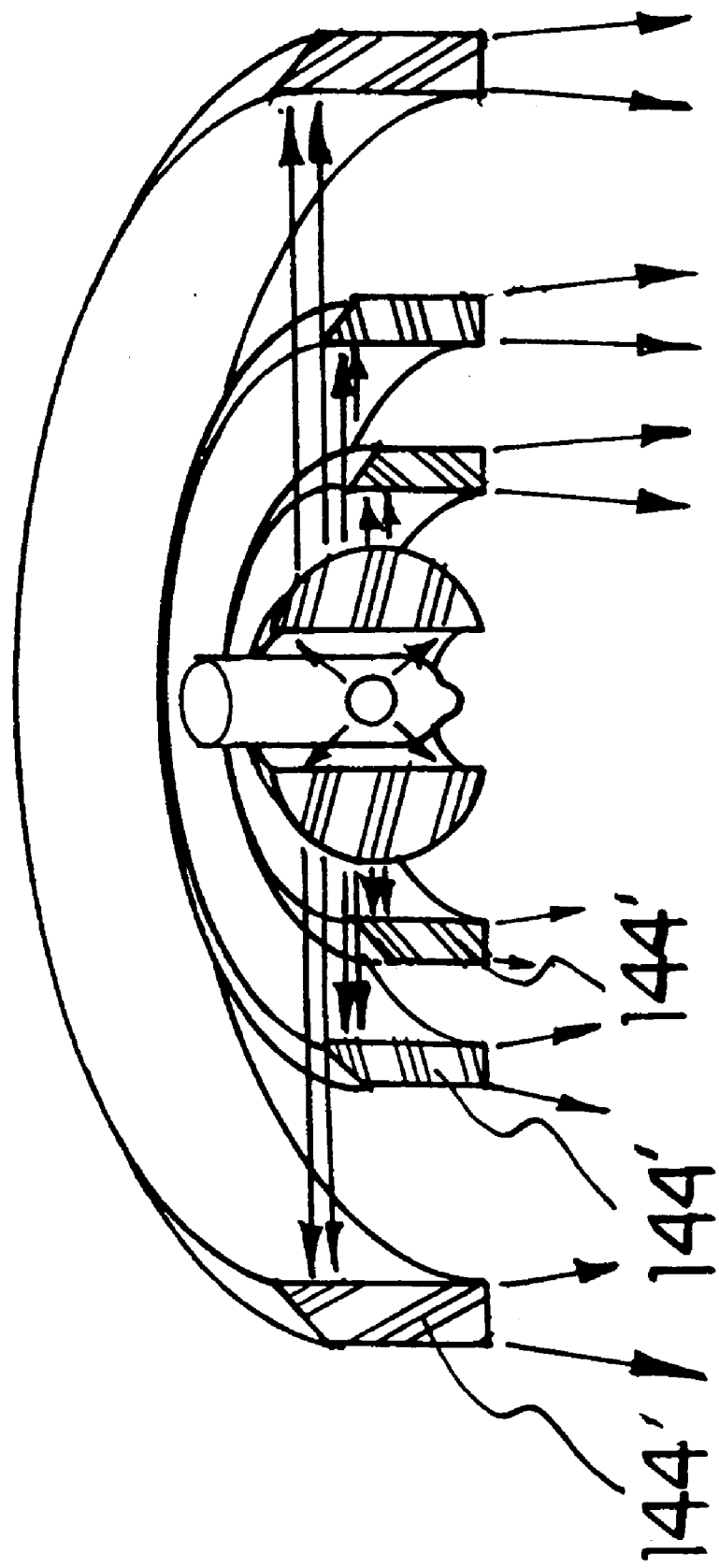
FIG. 44 is a partial cross sectional detail illustrating an alternative to the embodiment of FIG. 43 in which the distribution optics comprises multiple refractive members.

FIGS. 43 and 43A are a cross sectional elevation and an axonometric view, partially broken away, of another form of system with shallow conical reflective means 140 which reflects light to distribution optics members comprising concentric prism rings 144. Light from the radial collimator 10 is divided in the axial dimension. One portion of the light is directed toward the reflective surface 142 of a shallow cone 140. The center prism ring catches a greater proportionate share of light from the radial collimator as shown. Alternatively, concentric prism rings 144' may be provided having varying, successively increasing axial dimensions as in FIG. 44, a partial cross sectional illustration. The resulting illumination is in the form of concentric diverging rings.

FIG. 45 is a partial cross sectional detail illustrating an alternative to the embodiment of FIG. 43 in which light is refracted by a prism ring 152 rather being reflected to distribution optics for distribution;

FIGS. 46 and 47 are a cross sectional elevation and an axonometric view, partially broken away, of another form of system suitable for installation to an architectural panel with segmented reflective distribution optics. Concentrically disposed, axially displaced reflectors 160, each similar to the reflector cones 110 and 112 of the embodiment of FIG. 37. A central aperture of each succeedingly larger diameter reflector registers with the outer diameter of the preceding reflector. Parallel axially displaced, radially disposed plates 162 comprises segmented containment optics surrounding the collimation means.

FIGS. 48 and 49 are a cross sectional elevation and an axonometric view of another form of system suitable for installation to an architectural panel 94 with segmented reflective distribution optics wherein shadow eliminating light patterns are provided. In the embodiment of FIGS. 48 and 49, the light is redirected as to form overlapping shapes on a preselected surface. A reflective disc 170 is divided into sectors each subtending a preselected arc surrounding the source. In the present embodiment, each disc segment subtends 45 degrees, and the segments resemble a chrysanthemum pattern. Reflecting surfaces 172 at each exit aperture segment and redirect light to form a ring of overlapping shape. Light directed from exit apertures defines a ring of overlapping shapes, This overlapping illumination reduces shadowing since light is directed toward a given position from a number of angles.

Figure 51:
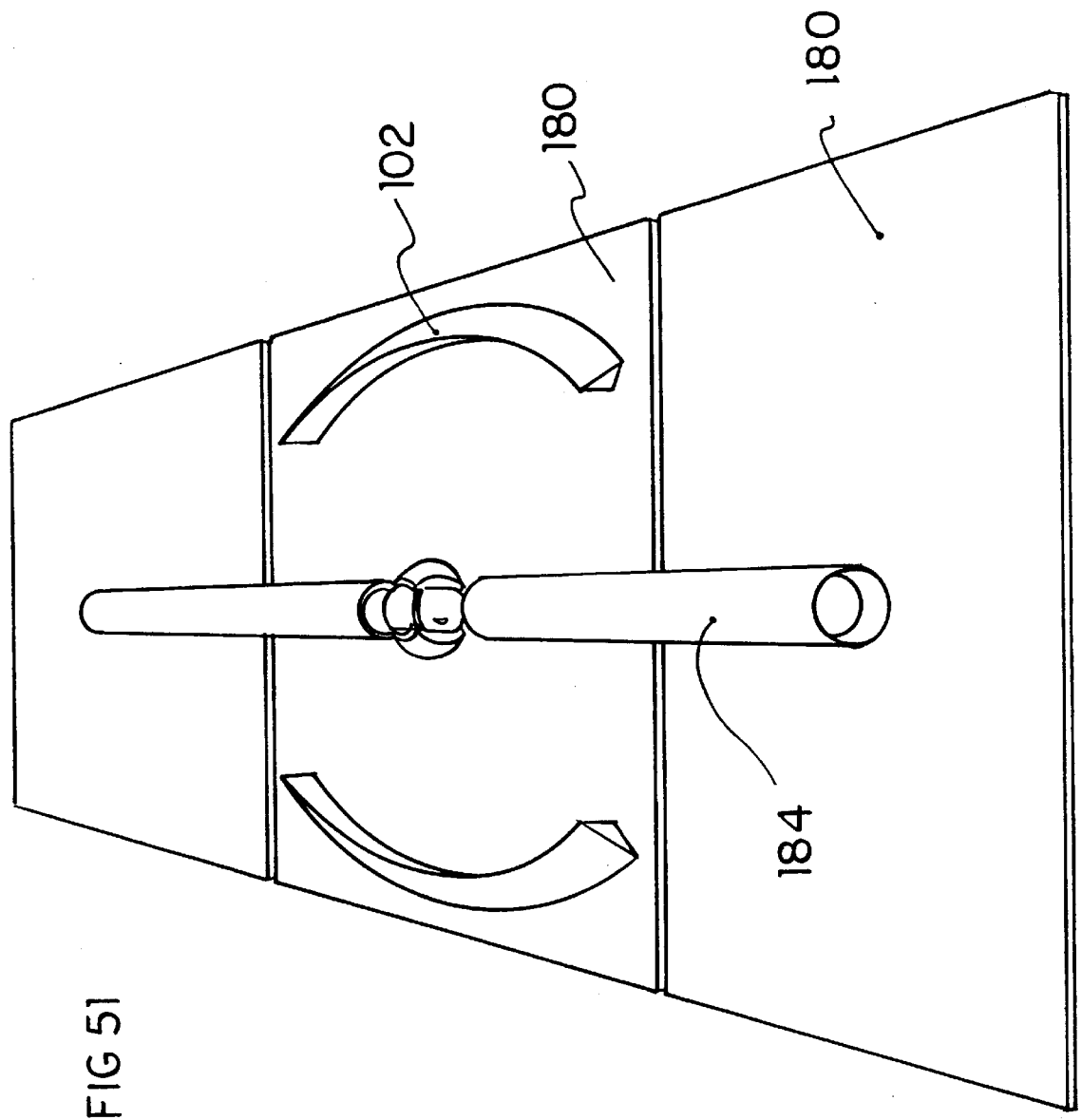

FIG. 50 is a perspective view from above a section of ceiling which may comprise a lighting panel 180 which is transparent, translucent or opaque with light-transmitting apertures. The panel 180 acts as an architectural integrator and an optical alignment device. The panel is also the supporting structural element for light distribution means. The light distribution means includes a collimator 10. In the embodiment of FIG. 50, the collimator is of the segmented type described with respect to FIG. 6 above. Alternatively, the collimator of FIG. 9 can be used. In this embodiment utilizing the collimator of FIG. 6, radial collimation ring segments are concentrically aligned with ring modulating segments. Lens collimation means feed tubes 184, which direct collimated light to optical utilization means as described above. As illustrated in FIG. 51, the lighting panel may be included in a system as disclosed in my U.S. Pat. No. 5,130,908. In these embodiments containment means are shaped to match the output from collimation means.

Figure 52:
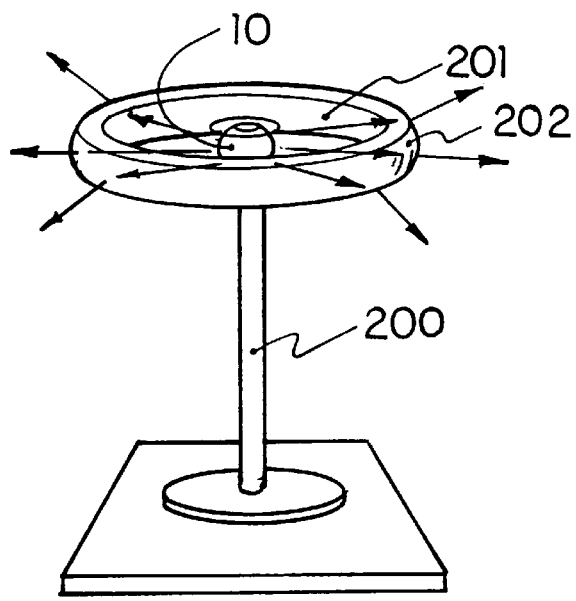
FIGS. 52, 53 and 54 are each a perspective view of a different form of system which can be utilized as a table lame and wherein a different form of distribution optics provides a particular form of light distribution.
Figure 53:
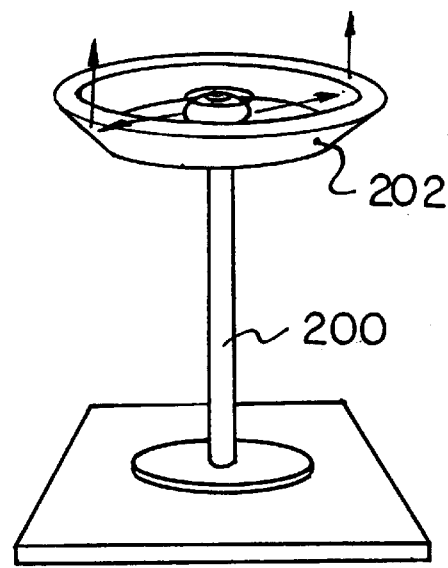
Figure 54:
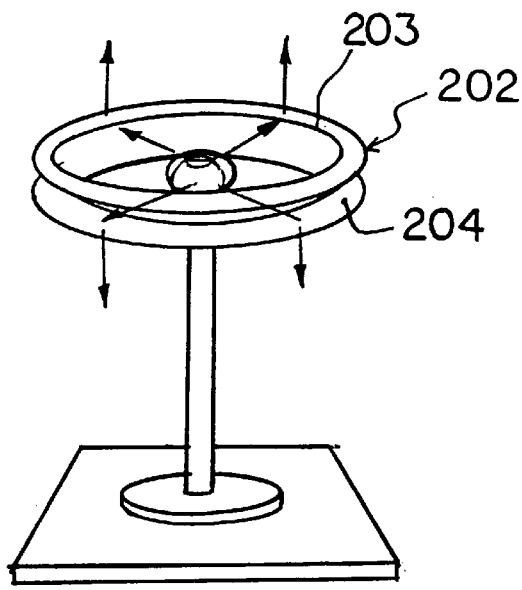

In the embodiments of FIGS. 52, 53 and 54, table lamps are illustrated. A radial collimator 10 is mounted to a central stand 200. A refracting or reflecting ring 202 is mounted concentrically with the collimator. A containment plate 201 surrounds the collimator 10 at an axial end thereof. In the embodiment of FIG. 52, the ring 202 provides for diffused, rapidly expanding radial light distribution. The ring section may be biconvex, biconcave, circular or be of a thin band of diffusion material. Diffusion material could be fabric or ground glass. Other ring structures could contain beaded or prismatic glass for refraction.

FIG. 53 utilizes a prismatic ring 202' for uplights. The embodiment of FIG. 54 includes a composite ring 202" having first and second ring members 203 and 204 surrounding the collimator and axially adjacent, i.e. as seen in FIG. 54, one is on top of the other. Both uplighting and downlighting are provided. It is within the teachings of the present invention to provide any combination of selected ring members, each for its purpose as described above.

In the embodiment of FIG. 55, the central collimator 10 is modified to provide multiple collimation. FIG. 56 is a detailed view, partially broken away to illustrate radial bores 19 which each receive a lens 18. As in the embodiment of FIGS. 9–11, conventional collimation is provided from each lens, while radial collimation is provided from the remainder of the collimator. As seen in FIG. 55, each lens 18 feeds a containment means, which may be a tube 210, having utilization means 214 coupled thereto. The utilization means 214 may comprise a sphere containing a mirror lens combination.

Figure 61:
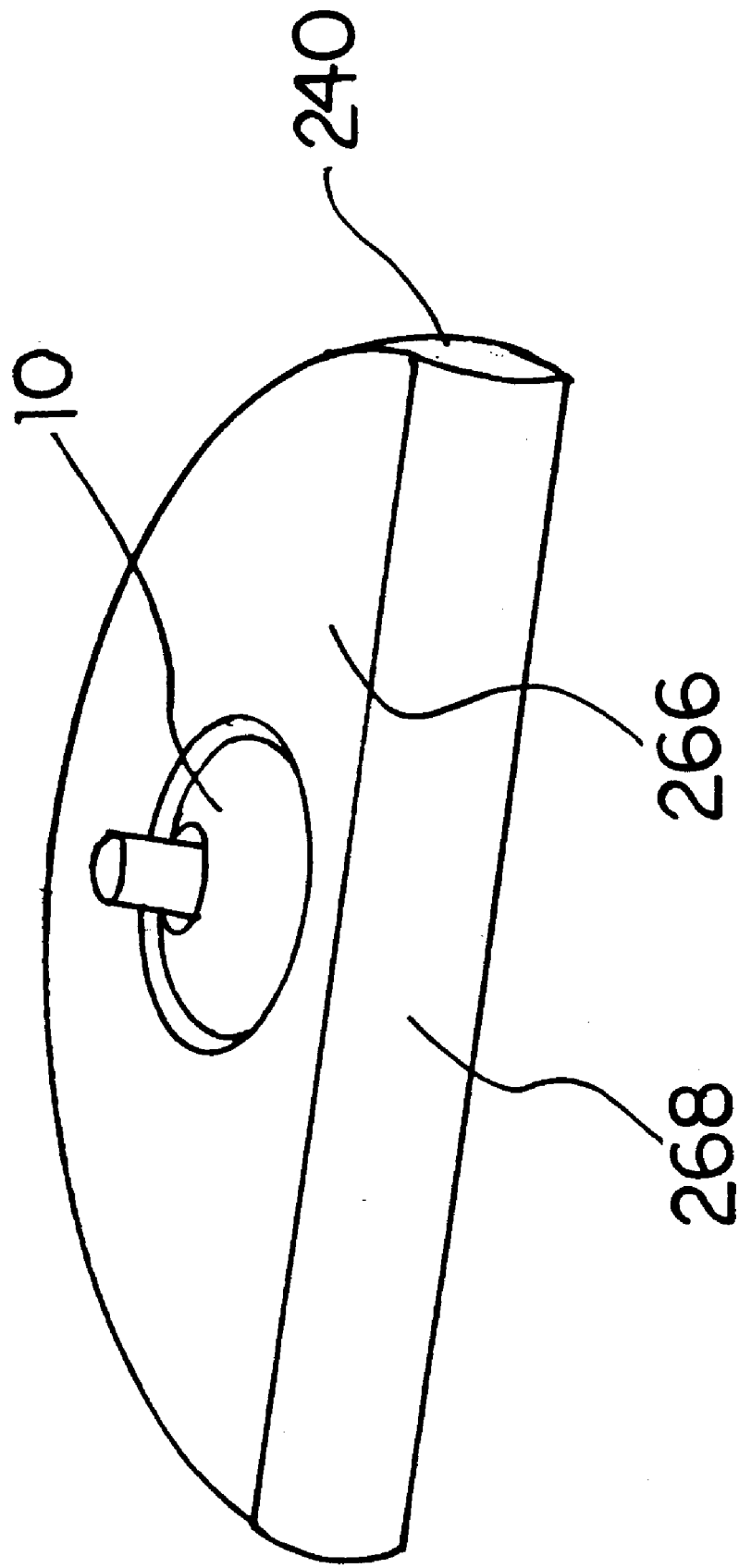
FIG. 61 is an axonometric illustration of a system including a solid block of refracting material in the distribution optics portion is formed.

Another generalized form of the present invention is particularly suited for lighting spaces exterior to automobiles as well as interior architectural spaces. FIG. 57 is an axonometric view of an embodiment in which distribution optics comprises a parabolic or ellipsoidal reflector, which may have a flat, spherical or aspherical surface in the axial, or vertical, dimension; FIG. 58 is a plan view of an embodiment in which the collimator in collimation optics is modified to provide conventional collimation within the segment which is not reflected; FIG. 59 is a cross sectional plan view of an embodiment in which a reflector intercepts and redirects forwardly directed radially collimated light; FIG. 60 is a cross sectional plan view of a system including a horizontally disposed lamp providing radiant energy; and FIG. 61 is an axonometric illustration of a system including a solid block of refracting material in the distribution optics portion is formed.

In the embodiment of FIG. 57, a single element or multi element radial collimator 10 may be used. The cylinder of light produced by the collimator is directed toward a parabolic or ellipsoidal reflector 240, which may have a flat, spherical or aspherical surface in the axial, or vertical, dimension. The reflected rays form a collimated beam whose cross section is in the from of a rectangle and which is collimated in one direction parallel to a radius. The transverse dimension is in substantially constant proportion to the axial dimension. The non-reflected rays which leave the radial collimator 10 provide for illumination angularly displaced from the selected radius. The extent of angular coverage can be determined by the extent of the reflector. In the operation of this embodiment, the radial disc projection is altered by the distribution optics, the reflector, from a 360 degree pattern to a pattern that is unidirectional in a selected planar degree of freedom. Such a construction may be utilized to produce automobile headlights. Such headlights have the advantage of being thin in the axial direction, giving flexibility to designers of auto body sections incorporating headlights. Also, radiant energy is directed in a direction in which it is needed. Axial divergence can be provided for if desired by altering the reflective surface to the convex or concave.

FIG. 58 illustrates an embodiment in which the collimator 10 is modified to provide conventional collimation within the segment which is not reflected. A lens 250 replaces a selected angular extent of the collimator ring 12. In the embodiment of FIG. 59. a reflector 254 intercepts and redirects the radiant disc of light which has not been directed toward the reflective surface 240. In some cases, it will be desirable to reflect all light rather than mixing reflected and directly transmitted light. The reflector 254 puts light back through the radial collimator 10 so that all light can be collimated in the direction of illumination.

The embodiment of FIG. 60 provides for a horizontally disposed lamp 2. The axis of the lamp can be in the same plane as the radiant energy. The collimator 10 takes the form of a collimator 260 which is segmented or bored to permit insertion of the metal halide lamp 2. FIG. 61 is an illustration of a refractor 266, which is a solid block of refracting material. A front face 268 of the refractor may be shaped as an exit aperture. The reflector 240 may be embodied in a rear surface of the refractor 266. This structure may be suited for use with a metal halide lamp.

Figure 62:
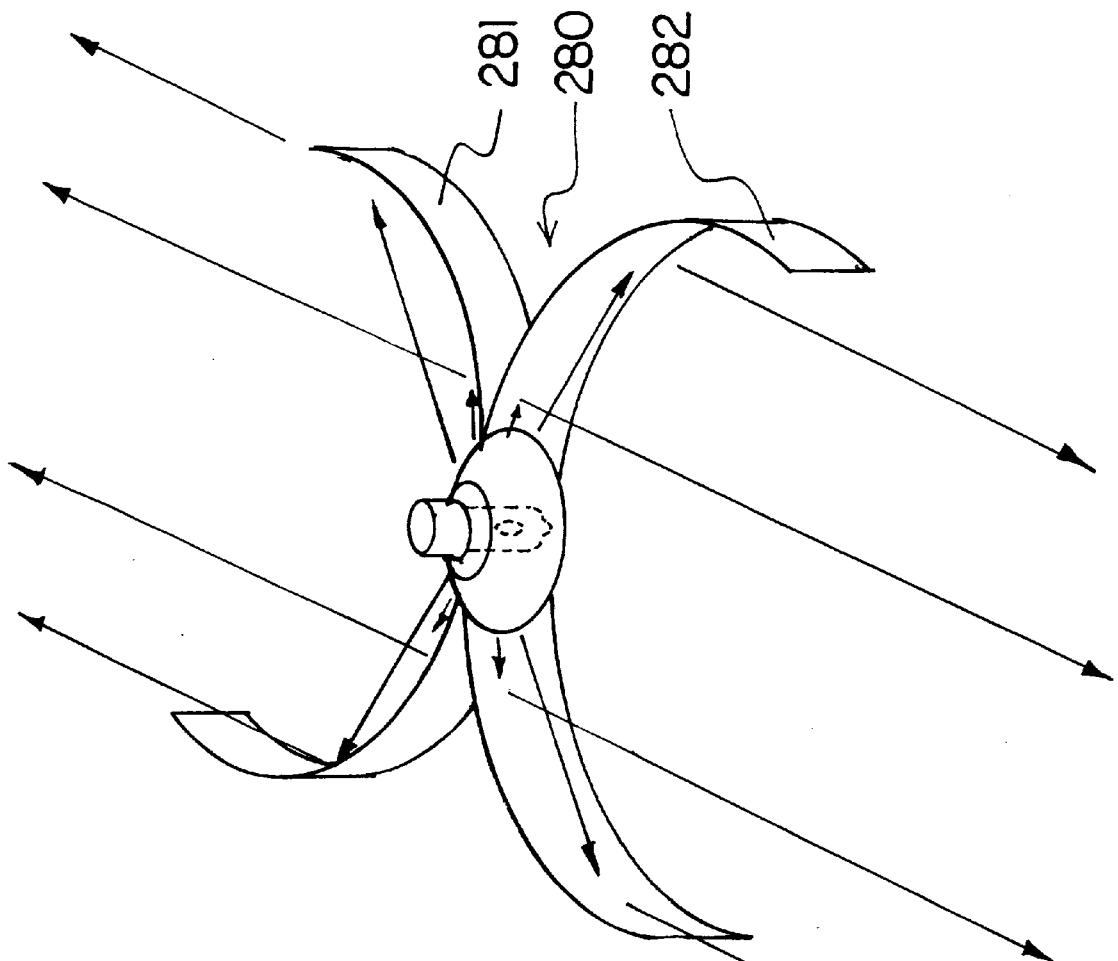
FIGS. 62 and 63 are respectively an axonometric an a plan illustration of embodiments respectively corresponding to FIGS. 59 and 59 respectively and further including means for bidirectional transmission in a given planar degree of freedom.
Figure 63:
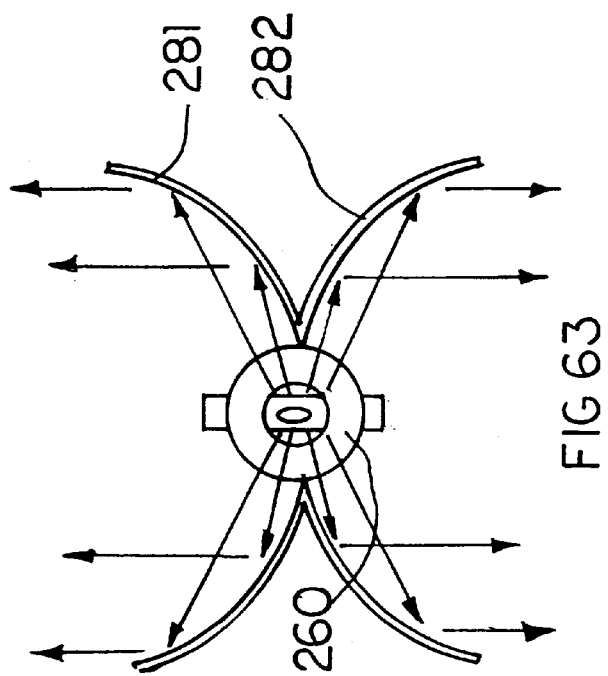

FIGS. 62 and 63 are respectively an axonometric an a plan illustration of embodiments respectively corresponding to FIGS. 59 and 59 respectively and further including means for bidirectional transmission in a given planar degree of freedom; FIG. 64 is an axonometric illustration of an embodiment which can be contained in the envelope of a rectangular parallelipiped; FIGS. 65, 66 and 67 each show different forms of exit means that may be included in the embodiment of FIG. 64; and FIG. 68 is an alternate form of the embodiment of FIG. 64 continuous contours may be used to shape the boundary of the distribution optics and exit means.

FIGS. 62 and 63 illustrate embodiments respectively corresponding to FIGS. 59 and 59 respectively. However, reflector means 280 are provided for bidirectional transmission in a given planar degree of freedom. The radial collimator 10 is placed at a focal point of overlaid, intersecting parabolic or ellipsoidal reflectors 281 and 282. The intersecting portions of the reflectors are removed, and the radial collimator 10 is mounted in the central portion of that intersection.

FIG. 64 is an axonometric illustration of an embodiment which can be contained in the envelope of a rectangular parallelipiped, a shelf 300. This may take the form, for example, of an illuminated shelving system or lighting system to illuminating paintings on a wall. The shelf 300 comprises a member defining the envelope of a three dimensional solid. In the embodiment illustrated in FIG. 64, multiple lamps 2 are provided. The shelf comprises a rectangular solid having a rectangular projection in plan and in a first side view, and a trapezoidal cross section in an orthogonal transverse degree of freedom. FIGS. 65, 66 and 67 each show different forms of exit means. The embodiment of FIG. 65 provides for lineal distribution from a convex exit face 302. FIG. 66 is a detailed view of the embodiment of FIG. 64 for directing light downwardly from an exit face 302'. In FIG. 67, exit means 302" comprises a refractor by which light is refracted both upwardly and downwardly. As taught in the present specification, the exit means 302 may take any one of a number of different forms. Alternatively, as seen in FIG. 68, continuous contours may be used to shape the boundary of the shelf 302. The shelf may be solid colored material or hollow with internally reflective surfaces.

In FIG. 64, a first radial collimator 10 directs light to an internally embedded parabolic surface 310. The reflector 310 is positioned so that rays reflected from the parabolic surface 310 leave directly perpendicularly to exit means 302. A second radial collimator 10a is provided which directs light to a reflective back surface 320. Reflected rays are incident on the exit means at each of a number of angles. Again, in accordance with the present invention, the two collimators could take differing forms such as described above. The reflectors may also each be selected to a given performance.

FIG. 69 is an axonometric view, partially broken away wherein distribution optics 59 comprises a shaped, axially extending band 326 surrounding the radial collimation means 10. In the embodiment of FIG. 69, a shaped, axially extending band surrounds the radial collimation means. The band 326 in the illustrated form has an intersection with a plane lying in the radial degree of freedom comprising an eight pointed star. This embodiment has utility in providing an illuminated shape. Legs 327 of the star are formed by rectangles which are parallel to the axis. The legs 327 forming the illuminated shape may be sandwiched between parallel, axially displaced transparent circular plates 330. Consequently light diffusing materials may be used which do not have the structural strength to maintain their disposition without support. The shapes formed by this material, which may be diffracting or diffusing, may be symmetrical or asymmetrical or may form the contour of an organic shape. Means (not shown) may also be provided for selected or continuous changing of the shape.

FIGS. 70 and 71 are a cross sectional elevation and an axonometric view, partially broken away of another form of system suitable for installation to an architectural member comprising a ceiling panel. A collimation optics means 10 is housed in a box 340 which may comprise an architectural member or a lighting fixture. Light distribution means may comprise various means described above. These may include an upper surface 344 axially above the collimation optics 10 which scatters light, a reflective surface 346 operating in manner similar to exit means 113 in FIG. 37 above, reflective vertical surfaces 350 and an axially lower diffusing plate 360. In an experimental embodiment, this embodiment provided twice the light output with one fifth the energy input as prior art embodiments utilizing fluorescent tubes. Even illumination is provided on the plate 360. It may be used as an artificial skylight.

The embodiments of FIGS. 72 through 75 illustrate that light can be combined from two quasi point sources. Metal halide light can be quite cool. By combining sources, the intensity of metal halide light can be combined with warmer wavelengths of an incandescent source. Alternatively, particularly as seen in FIG. 75, light can be delivered from a lineal light distribution means such as is described in my above-cited copending application. Even solar illumination may be piped in and combined with light from the lamp 2.

Figure 74:
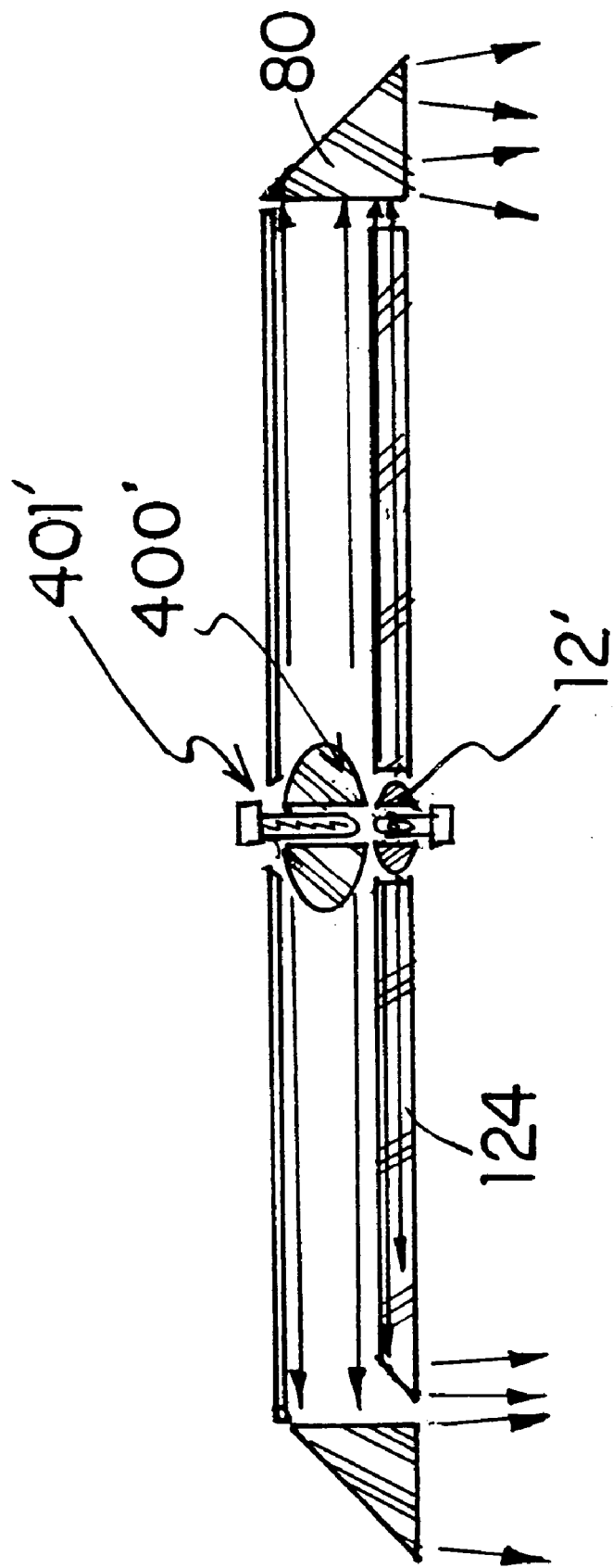

FIGS. 72 and 73 are an axonometric view partially broken away and a cross sectional view of an embodiment similar to that of FIGS. 23 and 24. A collimating lens assembly 401 comprising a lens ring 12 and a lens ring 400 coaxially mounted and both fitting within the axial extent of containment optics. A metal halide source 2 is centered within the lens ring 12, and an incandescent source 2' is centered within the lens ring 400. Light is mixed at the internally reflecting face 89. In the embodiment of FIG. 74, also a cross section, lens rings 400' and 12' have differing axial dimensions but have the same overall combined axial dimension as the lens rings 400 and 12. Additionally, a containment and distribution ring 405 may surround one lens ring, such as lens ring 12' and operate in a manner similar to a ring 124 in the embodiment of FIG. 41. Mixing takes place in the illuminated volume.

In the embodiment of FIG. 75, also an axonometric view broken away, the source 2' and lens ring 400 are replaced by a source distributor 420 which fits in the envelope of a lens ring. A central conical reflector 426 receives a light input from lineal light distribution means as described in my above-cited application relating to lineal light distribution. The conical reflector 426 is equivalent to a quasi point source and ring collimator in that the source distributor 420 can provide a radially collimated disc of light like that provided by a quasi point source. Operation proceeds as in the embodiment of FIGS. 72 and 73. Many forms of lighting may be combined in this manner.

The above teachings will enable those skilled in the art to make many modifications in the specific teachings above to provide many forms of systems for distributing and shaping light in accordance with the present invention.

What is claimed as new and desired to be secured by Letters Patent of the United States is:

1. Light distribution means for distributing and shaping light from a quasi point source comprising: radial collimation optics surrounding said quasi point source over a preselected angular extent around an axis said collimation optics including entrance aperture means extending in an axial direction for intercepting light from the source, containment means for controlling axial divergence of collimated light from said collimation optics with respect to radial distance from said source, distribution optics located radially outwardly of said collimation optics for intercepting light directed within a radial extent along the axis, said collimation optics directing light to said distribution optics, said containment means being formed to limit axial extent of said distribution optics required to intercept substantially all of the light delivered from said collimation optics, said distribution optics being shaped to provide a selected light distribution pattern.

2. Light distribution means according to claim 1 wherein said collimation optics comprises a first ring lens radially surrounding said quasi point source.

3. Light distribution means according to claim 2 wherein said containment means further comprises a second ring lens radially surrounding said first ring lens substantially axially coextensive with said first ring lens and radially spaced to capture a preselected amount of light comprising substantially all of the radiant flux from said first lens ring, whereby axial dispersion of light from said source is minimized.

4. Light distribution means according to claim 2 wherein said collimation optics comprises said second lens ring.

5. Light distribution means according to claim 3 comprising solid transmissive bridge means extending between said first and said second lens rings, whereby interface crossings of directly transmitted light are minimized.

6. Light distribution means according to claim 5 wherein the containment optics comprises an entrance aperture at said first ring lens and a section unitary with and extending radially outwardly of said second ring lens and having an exit aperture comprising said distribution optics.

7. Light distribution means according to claim 6 wherein said radially extending section comprises a plurality of concentric prism rings for intercepting light from an exit aperture of said second ring lens and distributing light therefrom.

8. Light distribution means according to claim 2 wherein said distribution optics is formed with an entrance aperture differing in axial dimension from said collimation optics and said containment means is formed as a physical bridge between the collimation optics and the distribution optics, said containment optics having an exit aperture for interfacing to an exit aperture of said distribution optics.

9. Light distribution means according to claim 2 wherein said containment means is comprised by the interaction of said first and second ring lenses.

10. Light distribution means according to claim 2 wherein said first ring lens is mounted adjacent an architectural surface and the containment means comprises the architectural surface.

11. Light distribution means according to claim 3 wherein the collimation optics is mounted to an architectural surface and wherein the outer ring lens has an exit aperture to direct light such that the distribution optics comprises the architectural surface.

12. Light distribution means according to claim 1 wherein said collimation optics comprises compound means including a ring lens radially surrounding said quasi point source and ring reflector means surrounding said quasi point source and axially bounding said ring lens, whereby substantially all of the radiant flux of said source is captured for distribution and the "f" number of said light distribution means is minimized.

13. Light distribution means according to claim 12 wherein said collimation optics include an ellipsoidal section and a concentric section, said ellipsoidal section and concentric tapered section being formed to be unitary.

14. Light distribution means according to claim 8 wherein said containment means divides radially directed light into a plurality of axially extending segments.

15. Light distribution means according to claim 1 wherein said containment means comprises parallel axially spaced plate and there being exit optics which comprises reflective surfaces on said plates.

16. Light distribution means according to claim 1 wherein said collimation optics is divided into segments each subtending a selected arc of a circle surrounding said quasi point source.

17. Light distribution means according to claim 16 wherein at least a first selected segment provides radial collimation and at least another selected segments provides lineal collimation.

18. Light distribution means according to claim 17 wherein said containment means are shaped to contain the shape of light coming from each said collimator segment.

19. Light distribution means according to claim 1 wherein said collimation optics comprises a ring lens having at least one bore formed therein for transmitting light which is not radially collimated.

20. Light distribution means according to claim 19 wherein a lens is placed in said bore.

21. Light distribution means according to claim 1 wherein containment means comprise a reflective plate extending within the radial degree of freedom.

22. Light distribution means according to claim 21 wherein said plate comprises a structural panel in a radial plane at one axial side of said collimation optics.

23. Light distribution means according to claim 2 wherein said containment means comprises a refractive ring and said distribution optics comprises an internally reflective surface of said refractive ring.

24. Light distribution means according to claim 2 wherein multiple distribution optics exit apertures are provided at differing radial distances from said collimation optics.

25. Light distribution means according to claim 24 wherein segments of said containment means comprise linear segments.

26. Light distribution means according to claim 2 wherein in said distribution optics is resolved into successive angularly displaced segments at varying angles to the radial plane.

27. Light distribution means according to claim 21 wherein said distribution optics and said containment means are comprised of a combined member having a first axially disposed ellipsoidal reflective surface radially displaced from and facing said collimation optics and joined at an axial end thereof to a shallow cone surrounding said collimation optics.

28. Light distribution means according to claim 27 comprising a plurality of said combined members spaced in axial succession in registration with a portion of the axial extent of said collimation optics and successively increasing diameter, each successive member having a central aperture therein receiving an opposite axial end of the reflective surface of a preceding member of smaller diameter.

29. Light distribution means according to claim 27 wherein said cone is resolved in to plurality of sectors including radially extending exit means being joined to the exit means an outer circumference of said cone.

30. Light distribution means according to claim 1 wherein said distribution optics exit aperture comprises refractive means.

31. Light distribution means according to claim 30 wherein said distribution optics exit aperture comprises a lens.

32. Light distribution means according to claim 1 wherein said containment means comprises concentric prism rings of differing diameter and successively increasing axial dimension, said prism rings having internally reflective surfaces of said prism rings comprising said distribution optics.

33. Light distribution means according to claim 1 wherein said distribution optics comprises internally reflecting surfaces on concentric prism rings and said containment means comprises reflecting means distributing light to said rings.

34. Light distribution means according to claim 1 wherein said containment means comprises concentric prisms varying in axial dimension and placed to intercept radially directed light form said collimation optics.

35. Light distribution means according to claim 1 wherein said containment means is axially segmented to deliver portions of light to the distribution optics.

36. Light distribution means according to claim 1 wherein said containment means defines a radial degree of freedom and is segmented within the radial degree of freedom.

37. Light distribution means according to claim 1 wherein said distribution optics comprises a prism ring for providing a conical output pattern.

38. Light distribution means according to claim 1 wherein said distribution optics comprises a prism ring for providing a conical output pattern.

39. Light distribution means according to claim 1 further comprising an additional light distribution member concentric with said distribution optics and having an entrance aperture in registration with an exit aperture of said distribution optics.

40. Light distribution means according to claim 1 wherein said containment means is formed to be unitary with said collimation optics and said distribution optics.

41. Light distribution means according to claim 1 wherein said collimation optics comprises a plurality of discrete components radially surrounding said quasi point source.

42. Light distribution means according to claim 41 wherein said distribution optics comprises discrete components each in radial registration with a component of said collimation optics.

43. Light distribution means according to claim 42 wherein said containment means comprises a transmissive panel in a architectural member.

44. A lamp comprising light distribution means according to claim 1 mounted on support means to support said light distribution means on a floor, table or wall and thereby to comprise a lamp.

45. Light distribution means according to claim 1 comprising distribution optics having transmissive portions for providing ambient light and diffusing means for providing diffused light.

46. A lamp comprising light distribution means according to claim 45 mounted on support means to support said light distribution means on a floor, table or wall and thereby to comprise a lamp.

47. Light distribution means according to claim 1 wherein said collimation optics and said distribution optics are formed to contain substantially all light from the source in a segment of the radial plane and wherein the distribution optics comprise a first reflector which is parabolic in the radial plane and wherein the source is at a focus of the parabola.

48. Light distribution means according to claim 47 wherein a second reflector is provided to intercept and redirect the radiant disc of light which has not been directed toward said first reflector.

49. Light distribution means according to claim 48 wherein said collimation optics, distribution optics and containment means comprise a unitary body wherein the collimation optics are disposed at the focal shared focal point of first and second overlaid and oppositely directed parabolae comprising said distribution optics.

50. Light distribution means according to claim 2 wherein said containment means comprises parallel surfaces of a structural form.

51. Light distribution means according to claim 50 comprising a plurality of said collimation optics each associated with a source, all said collimation optics being housed in one said containment means.

52. Light distribution means according to claim 50 comprising a plurality of said distribution optics within said containment means.

53. Light distribution means according to claim 50 wherein a plurality of said collimation optics are associated with a common said distribution optics.

54. Light distribution means according to claim 50 wherein the containment means has an axial degree of freedom, and the distribution optics are formed into a band having a selected extent in the axial degree of freedom and a radial cross section defining a selected polygon.

55. A light distribution means comprising first and second collimation optics each containing a separate quasi point source, a containment optics for limiting axial dispersion of light from said first and second collimation optics, and distribution optics receiving light from both said first and second collimation optics, whereby light from both sources may be mixed and distributed in a distribution pattern of the light distribution optics.

56. Light distribution means according to claim 55 wherein said first and second collimation optics are mounted coaxially and have a combined axial dimension substantially corresponding to the axial dimension of said distribution optics.

57. Light distribution means according to claim 56 wherein one said point source comprises an input from lineal light distribution means.

58. Light distribution means consisting of a downlight comprising segmented collimation optics having an axial extent in an axial degree of freedom, said collimation optics comprising means for providing radially collimated and lineally collimated light from a quasi point source, containment means for limiting axial dispersion of collimated light with respect to distance from the source, and distribution optics substantially contained within the axial extent of said collimation optics and receiving both the radially collimated and lineally collimated light and directing the beams to provide a combination of beams, whereby a preselected combination of light patterns for surface illumination and wall washing is provided.

59. Light distribution means according to claim 58 wherein said distribution optics is axially segmented into concentric rings.

60. In a light distribution means for distributing and shaping light from a quasi point source comprising: radial collimation optics surrounding said quasi point source over a preselected angular extent around an axis, said collimation optics including entrance aperture means extending in an axial direction for intercepting light from said source and distribution optics located radially outwardly of said collimation optics for intercepting light directed within a radial degree of freedom, said distribution optics being shaped to provide a selected light distribution pattern, the improvement wherein said collimation optics is divided into segments each subtending a selected arc of a circle surrounding said quasi point source.

61. The improvement according to claim 60 wherein at least a first selected segment provides radial collimation and at least another selected segments provides lineal collimation.

62. The improvement according to claim 61 further comprising containment means shaped to contain the shape of light coming from each said collimator segment.

63. Light distribution means according to claim 60 wherein said collimation optics comprises a ring lens having at least one bore formed therein for transmitting light which is not radially collimated.

64. Light distribution means according to claim 1 wherein said containment optics comprise parallel upper and lower containment plates at opposite axial sides of said collimation optics and further comprising ribs each radially disposed and extending in the axial direction to connect said upper and lower containment plates.

65. Light distribution means for distributing and shaping light from a quasi-point source comprising: radial collimation optics surrounding said quasi point source over a preselected angular extent around an axis, said collimation optics including entrance aperture means extending in an axial direction for intercepting light from said source, and distribution optics located radially outwardly of said collimation optics for intercepting light directed within a radial degree of freedom, said collimation and said distribution optics being formed to contain substantially all light from the source in a segment of a radial plane and wherein the distribution optics comprising first reflector which is parabolic in the radial plane and wherein the source is at a focus of the parabolic in the radial plane and wherein the source is at a focus of the parabola, said reflector having a dimension in an axial degree of freedom substantially corresponding to that of said collimation optics, and wherein said reflector is formed to capture substantially all radiating from said collimation means in an arc subtended by said reflector.

* * * * *